United States Patent
Long et al.

(10) Patent No.: US 12,517,585 B2
(45) Date of Patent: Jan. 6, 2026

(54) CONTROL POINT MANIPULATION TECHNIQUES IN HAPTIC SYSTEMS

(71) Applicant: Ultraleap Limited, Bristol (GB)

(72) Inventors: Benjamin John Oliver Long, Bristol (GB); Brian Kappus, Campbell, CA (US); Rory Clark, Bristol (GB)

(*) Notice: Subject to any disclaimer, the term of this patent is extended or adjusted under 35 U.S.C. 154(b) by 555 days.

(21) Appl. No.: 17/812,444

(22) Filed: Jul. 13, 2022

(65) Prior Publication Data
US 2023/0036123 A1    Feb. 2, 2023

Related U.S. Application Data

(60) Provisional application No. 63/232,599, filed on Aug. 12, 2021, provisional application No. 63/223,067, (Continued)

(51) Int. Cl.
G06F 3/01    (2006.01)
G10K 11/18   (2006.01)

(52) U.S. Cl.
CPC .............. *G06F 3/016* (2013.01); *G06F 3/011* (2013.01); *G10K 11/18* (2013.01)

(58) Field of Classification Search
CPC ..... G10K 11/18; H04R 2217/03; G06F 3/011; G06F 3/016
(Continued)

(56) References Cited

U.S. PATENT DOCUMENTS 4,218,921 A    8/1980  Berge
4,760,525 A    7/1988  Webb
(Continued)

FOREIGN PATENT DOCUMENTS

CA    2470115 A1    6/2003
CA    2909804 A1    11/2014
(Continued)

OTHER PUBLICATIONS

Long et al. ("Rendering volumetric haptic shapes in mid-air using ultrasound." ACM Transactions on Graphics (TOG) 33.6 (2014): 1-10.) (Year: 2014).*
(Continued)

*Primary Examiner* — Jonathan Malikasim
*Assistant Examiner* — Christopher Richard Walker

(57) ABSTRACT

A method for blending new control points into the field is described. A more costly but conceptually simpler method, measuring the extant field and recreating a copy of that field interpolated with the actually desired value at a new control point is first described. Further, traditionally predicting the output of phased array systems involves taking each element and evaluating its contribution to the field. When focusing phased arrays, predicting the output and the fringing field is necessary for multipoint focusing and acoustic cloaking applications. In the limit of a large enough number of discrete transducer elements, the evaluation of a single approximation will inevitably outperform even a linear summation over the linear acoustic properties of the elements. Further, to resolve the misalignment of expected and realized output of the mid-air haptic array, interactable objects are subdivided into customizable, uniform, intersection "regions" that are then used to compute a volume of 3D positions in which the haptic focal point is then moved between. Positions can be produced and assigned in different ways, and volumes can be produced from any object as long as they have their regions pre-computed. Rather than directly targeting the hand of the user, the virtual intersection of the hand are used and these regions create a generally larger volume in which mid-air haptics can be produced.

5 Claims, 8 Drawing Sheets

Related U.S. Application Data filed on Jul. 19, 2021, provisional application No. 63/221,937, filed on Jul. 15, 2021.

(58) Field of Classification Search
USPC .......................................................... 367/95
See application file for complete search history.

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,122,993 A | 6/1992 | Hikita |
| 5,226,000 A | 7/1993 | Moses |
| 5,235,986 A | 8/1993 | Maslak |
| 5,243,344 A | 9/1993 | Kouloupoulos |
| 5,329,682 A | 7/1994 | Thurn |
| 5,371,834 A | 12/1994 | Tawel |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,533,455 B2 | 3/2003 | Graumann |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,154,928 B2 | 12/2006 | Sandstrom |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 | 1/2013 | Fujimura |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,786,092 B2 | 10/2017 | Santhanam |
| 9,795,446 B2 | 10/2017 | Dimaio |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,936,908 B1 | 4/2018 | Acosta |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 | 6/2019 | Sinha |
| 10,383,694 B1 | 8/2019 | Venkataraman |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 | 1/2020 | Rigiroli |
| 10,569,300 B2 | 2/2020 | Hoshi |
| 10,593,101 B1 | 3/2020 | Han |
| 10,599,434 B1 | 3/2020 | Barrett |
| 10,657,704 B1 | 5/2020 | Han |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 | 4/2021 | Bousmalis |
| 11,048,329 B1 | 6/2021 | Lee |
| 11,080,874 B1 | 8/2021 | Bardagjy |
| 11,098,951 B2 | 8/2021 | Kappus |
| 11,106,273 B2 | 8/2021 | Hazra |
| 11,113,860 B2 | 9/2021 | Rigiroli |
| 11,125,866 B2 | 9/2021 | Sumi |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,334,165 B1 | 5/2022 | Clements |
| 11,350,909 B2 | 6/2022 | Maresca |
| 11,475,247 B2 | 10/2022 | Nikolenko |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 11,669,661 B2 | 6/2023 | Mirzendehdel |
| 11,693,113 B2 | 7/2023 | Bachmann |
| 11,704,983 B2 | 7/2023 | Long |
| 11,714,492 B2 | 8/2023 | Carter |
| 11,715,453 B2 | 8/2023 | Kappus |
| 11,727,790 B2 | 8/2023 | Carter |
| 11,740,018 B2 | 8/2023 | Kappus |
| 11,742,870 B2 | 8/2023 | Long |
| 11,768,540 B2 | 9/2023 | Long |
| 11,816,267 B2 | 11/2023 | Kappus |
| 11,830,351 B2 | 11/2023 | Carter |
| 11,830,352 B1 | 11/2023 | Agrawal |
| 11,842,517 B2 | 12/2023 | Lyons |
| 11,886,639 B2 | 1/2024 | Brown |
| 11,921,928 B2 | 3/2024 | Iodice |
| 11,955,109 B2 | 4/2024 | Long |
| 12,100,288 B2 | 9/2024 | Carter |
| 12,158,522 B2 | 12/2024 | Iodice |
| 2001/0007591 A1 | 7/2001 | Pompei |
| 2001/0033124 A1 | 10/2001 | Norris |
| 2001/0053204 A1 | 12/2001 | Navab |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |

(56) References Cited

U.S. PATENT DOCUMENTS

| | | |
|---|---|---|
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0148874 A1 | 7/2005 | Brock-Fisher |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |
| 2007/0036492 A1 | 2/2007 | Lee |
| 2007/0056374 A1 | 3/2007 | Andrews |
| 2007/0094317 A1 | 4/2007 | Wang |
| 2007/0177681 A1 | 8/2007 | Choi |
| 2007/0214462 A1 | 9/2007 | Boillot |
| 2007/0216711 A1 | 9/2007 | Smith |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 | 6/2008 | Fujimura |
| 2008/0226088 A1 | 9/2008 | Aarts |
| 2008/0273723 A1 | 11/2008 | Hartung |
| 2008/0291198 A1 | 11/2008 | Chun |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0134225 A1 | 6/2011 | Saint-Pierre |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0113223 A1 | 5/2012 | Hilliges |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | Mcelveen |
| 2013/0173658 A1 | 7/2013 | Adelman |
| 2013/0271397 A1 | 10/2013 | Macdougall |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0306891 A1 | 10/2014 | Latta |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0002517 A1 | 1/2015 | Lee |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0187134 A1 | 7/2015 | Baecher |
| 2015/0192995 A1 | 7/2015 | Subramanian |
| 2015/0209564 A1 | 7/2015 | Lewin |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0309629 A1 | 10/2015 | Amariutei |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1* | 5/2016 | Carter ............... G06F 3/016 |
| | | 367/95 |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1* | 8/2016 | Carter ............... G08B 6/00 |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0358477 A1 | 12/2016 | Ansari |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |

(56) References Cited

U.S. PATENT DOCUMENTS

| | | |
|---|---|---|
| 2017/0144190 A1 | 5/2017 | Hoshi |
| 2017/0153707 A1 | 6/2017 | Subramanian |
| 2017/0168586 A1 | 6/2017 | Sinha |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0249932 A1 | 8/2017 | Maxwell |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0018787 A1 | 1/2018 | Giancola |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |
| 2018/0246576 A1 | 8/2018 | Long |
| 2018/0253627 A1 | 9/2018 | Baradel |
| 2018/0263708 A1 | 9/2018 | Kim |
| 2018/0267156 A1 | 9/2018 | Carter |
| 2018/0271494 A1 | 9/2018 | Cuscuna |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0001129 A1 | 1/2019 | Rosenbluth |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1 | 3/2020 | Tsai |
| 2020/0082804 A1 | 3/2020 | Kappus |
| 2020/0103974 A1 | 4/2020 | Carter |
| 2020/0117229 A1 | 4/2020 | Long |
| 2020/0117993 A1 | 4/2020 | Martinez-Canales |
| 2020/0193269 A1 | 6/2020 | Park |
| 2020/0218354 A1 | 7/2020 | Beattie |
| 2020/0257371 A1 | 8/2020 | Sung |
| 2020/0285888 A1 | 9/2020 | Borar |
| 2020/0294299 A1 | 9/2020 | Rigiroli |
| 2020/0302760 A1 | 9/2020 | Carter |
| 2020/0320347 A1 | 10/2020 | Nikolenko |
| 2020/0320351 A1 | 10/2020 | Nikolenko |
| 2020/0327418 A1 | 10/2020 | Lyons |
| 2020/0380832 A1 | 12/2020 | Carter |
| 2021/0037332 A1 | 2/2021 | Kappus |
| 2021/0043070 A1 | 2/2021 | Carter |
| 2021/0056693 A1 | 2/2021 | Cheng |
| 2021/0109712 A1 | 4/2021 | Long |
| 2021/0111731 A1 | 4/2021 | Oliver |
| 2021/0112353 A1 | 4/2021 | Brian |
| 2021/0141458 A1 | 5/2021 | Sarafianou |
| 2021/0162457 A1 | 6/2021 | Ebefors |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0275141 A1 | 9/2021 | Eckersley |
| 2021/0294419 A1 | 9/2021 | Lee |
| 2021/0303072 A1 | 9/2021 | Carter |
| 2021/0303758 A1 | 9/2021 | Long |
| 2021/0334706 A1 | 10/2021 | Yamaguchi |
| 2021/0381765 A1 | 12/2021 | Kappus |
| 2021/0397261 A1 | 12/2021 | Kappus |
| 2022/0000447 A1 | 1/2022 | Eibl |
| 2022/0035479 A1 | 2/2022 | Lasater |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long |
| 2022/0300070 A1 | 9/2022 | Michele |
| 2022/0329250 A1 | 10/2022 | Long |
| 2022/0393095 A1 | 12/2022 | Chilles |
| 2023/0075917 A1 | 3/2023 | Pittera |
| 2023/0087395 A1 | 3/2023 | Borar |
| 2023/0117919 A1 | 4/2023 | Michele |
| 2023/0124704 A1 | 4/2023 | Rorke |
| 2023/0141896 A1 | 5/2023 | Liu |
| 2023/0168228 A1 | 6/2023 | Brian |
| 2023/0215248 A1 | 7/2023 | Lowther |
| 2023/0228857 A1 | 7/2023 | Carter |
| 2023/0251720 A1 | 8/2023 | William |
| 2023/0259213 A1 | 8/2023 | Long |
| 2023/0298444 A1 | 9/2023 | Kappus |
| 2023/0360504 A1 | 11/2023 | Kappus |
| 2023/0368771 A1 | 11/2023 | Kappus |
| 2023/0378966 A1 | 11/2023 | Long |
| 2024/0021072 A1 | 1/2024 | Carter |
| 2024/0036652 A1 | 2/2024 | Yamada |
| 2024/0056655 A1 | 2/2024 | Page |
| 2024/0069640 A1 | 2/2024 | Long |
| 2024/0095953 A1 | 3/2024 | Lyons |
| 2024/0096183 A1 | 3/2024 | Carter |
| 2024/0129655 A1 | 4/2024 | Chilles |
| 2024/0135789 A1 | 4/2024 | Long |
| 2024/0157399 A1 | 5/2024 | Buckland |
| 2024/0231492 A1 | 7/2024 | Beattie |
| 2024/0265907 A1 | 8/2024 | Long |
| 2024/0288945 A1 | 8/2024 | Long |
| 2024/0296825 A1 | 9/2024 | Long |
| 2024/0402809 A1 | 12/2024 | Kappus |
| 2024/0402996 A1 | 12/2024 | Long |
| 2024/0411374 A1 | 12/2024 | Wren |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| CN | 108780642 A | 11/2018 |
| CN | 116034422 A | 4/2023 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |

(56) References Cited

FOREIGN PATENT DOCUMENTS

| | | |
|---|---|---|
| EP | B207817 A1 | 8/2017 |
| EP | 3216231 B1 | 8/2019 |
| EP | 3916525 | 12/2021 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| TW | 201308837 | 2/2013 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2016171651 | 10/2016 |
| WO | 2017172006 | 10/2017 |
| WO | 2018000731 A1 | 1/2018 |
| WO | 2018109466 A1 | 6/2018 |
| WO | 2018168562 A1 | 9/2018 |
| WO | 2019190894 | 10/2019 |
| WO | 2020049321 A2 | 3/2020 |
| WO | 2021130505 A1 | 7/2021 |
| WO | 2021260373 A1 | 12/2021 |
| WO | 2021262343 | 12/2021 |

OTHER PUBLICATIONS

Hoshi et al. ("Noncontact tactile display based on radiation pressure of airborne ultrasound." IEEE transactions on haptics 3.3 (2010): 155-165.) (Year: 2010).*
Aksel Sveier et al.,Pose Estimation with Dual Quaternions and Iterative Closest Point, 2018 Annual American Control Conference (ACC) (8 pages).
JP Office Action for JP 2020-534355 (Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Final Rejection) dated Mar. 21, 2023 for U.S. Appl. No. 16/995,819 (pp. 1-7).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Notice of Allowance and Fees Due (PTOL-85) dated Mar. 8, 2023 for U.S. Appl. No. 17/721,315 (pp. 1-8).
Office Action (Notice of Allowance and Fees Due (PTOL-85) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Partial ISR for PCT/GB2023/050001 (Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.
"Ryoko Takahashi, Keisuke Hasegawa, Hiroyuki Shinoda, Tactile Stimulation by Repetitive Lateral Movement of Midair Ultrasound Focus, Apr.-Jun. 2020, IEEE Transactions on Haptics, vol. 13, No. 2" (Year: 2020) 9 pages.
Bjørn Kolbrek, Modal Propagat Ion in Acous T IC Horns (Jun. 2012) (127 pages).
Chen, Xi. "Real-time Action Recognition for RGB-D and Motion Capture Data." (2014). (Year: 2014) 107 pages.
Kavan et al. (Dual Quaternions for Rigid Transformation Blending, 2006, ResearchGate, pp. 2-11) (Year: 2006).
Kussaba et al. (Hybrid kinematic control for rigid body pose stabilization using dual quaternions, Journal of the Franklin Institute 354 (2017) 2769-2787) (Year: 2017).
Notice of Allowance dated Sep. 16, 2024 for U.S. Appl. No. 18/305,354 (pp. 1-9).
Office Action (Final Rejection) dated Jun. 27, 2024 for U.S. Appl. No. 18/188,584 (pp. 1-5).
Office Action (Final Rejection) dated Aug. 1, 2024 for U.S. Appl. No. 18/305,354 (pp. 1-10).
Office Action (Non-Final Rejection) dated Jun. 4, 2024 for U.S. Appl. No. 18/348,663 (pp. 1-18).
Office Action (Non-Final Rejection) dated Jun. 5, 2024 for U.S. Appl. No. 18/513,902 (pp. 1-16).
Office Action (Non-Final Rejection) dated Jun. 10, 2024 for U.S. Appl. No. 17/212,774 (pp. 1-15).
Office Action (Non-Final Rejection) dated Jun. 26, 2024 for U.S. Appl. No. 16/564,016 (pp. 1-15).
Office Action (Non-Final Rejection) dated Jul. 25, 2024 for U.S. Appl. No. 17/822,224 (pp. 1-16).
Office Action (Non-Final Rejection) dated Jul. 30, 2024 for U.S. Appl. No. 18/365,313 (pp. 1-7).
Office Action (Non-Final Rejection) dated Aug. 26, 2024 for U.S. Appl. No. 18/417,653 (pp. 1-13).
Office Action (Non-Final Rejection) dated Aug. 27, 2024 for U.S. Appl. No. 18/153,337 (pp. 1-6).
Office Action (Non-Final Rejection) dated Dec. 18, 2024 for U.S. Appl. No. 18/496,002 (pp. 1-5).

(56) References Cited

OTHER PUBLICATIONS

Office Action (Non-Final Rejection) dated Dec. 19, 2024 for U.S. Appl. No. 18/623,940 (pp. 1-7).
Office Action (Notice of Allowance and Fees Due (PTOL-85)) dated May 30, 2024 for U.S. Appl. No. 18/359,951 (pp. 1-7).
Office Action (Notice of Allowance and Fees Due (PTOL-85)) dated Jul. 22, 2024 for U.S. Appl. No. 17/835,411 (pp. 1-7).
Office Action (Notice of Allowance and Fees Due (PTOL-85)) dated Aug. 5, 2024 for U.S. Appl. No. 17/835,411 (pp. 1-2).
Office Action (Notice of Allowance and Fees Due (PTOL-85)) dated Aug. 28, 2024 for U.S. Appl. No. 18/365,313 (pp. 1-5).
Office Action (Notice of Allowance and Fees Due (PTOL-85)) dated Dec. 11, 2024 for U.S. Appl. No. 18/648,428 (pp. 1-8).
Polychronopoulos et al., Acoustic levitation with optimized reflective metamaterials, Scientific Reports (2020) 10:4254 (10 pages).
Supancic et al., "Depth-based hand pose estimation: data, methods, and challenges." In Proceedings of the IEEE international conference on computer vision, pp. 1868-1876. 2015. (Year: 2015).
Wang et al. (Translation and attitude synchronization for multiple rigid bodies using dual quaternions, Journal of the Franklin Institute 354 (2017) 3594-3616) (Year: 2017).
Wu et al. (Strapdown Inertial Navigation System Algorithms Based on Dual Quaternions,2009, IEEE, 2005, pp. 110-132) (Year: 2005).
Zhao et al., "Combining marker-based MOCAP and RGB-d camera for acquiring high-fidelity hand motion data." In Proceedings of the ACMSIGGRAPH/EurographicsSymposiumonComputer Animation. Eurographics Association, 33-42, 2012. (Year: 2012).
EPO Communication for Application 18 811 906.9 (Nov. 29, 2021) (15 pages).
ISR and WO for PCT/GB2021/052415 (Dec. 22, 2021) (16 pages).
Gareth Young et al.. Designing Mid-Air Haptic Gesture Controlled User Interfaces for Cars, PACM on Human- Computer Interactions, Jun. 2020 (24 pages).
Office Action (Non-Final Rejection) dated Mar. 4, 2022 for U.S. Appl. No. 16/404,660 (pp. 1-5).
Office Action (Notice of Allowance and Fees Due (PTOL-85)) dated Mar. 7, 2022 for U.S. Appl. No. 16/600,496 (pp. 1-5).
Office Action (Non-Final Rejection) dated Mar. 15, 2022 for U.S. Appl. No. 16/144,474 (pp. 1-13).
Office Action (Final Rejection) dated Mar. 14, 2022 for U.S. Appl. No. 16/564,016 (pp. 1-12).
Office Action (Non-Final Rejection) dated Apr. 1, 2022 for U.S. Appl. No. 16/229,091 (pp. 1-10).
ISR & WO For PCT/GB2021/052946, 15 pages.
Communication Pursuant to Article 94(3) EPC for EP 19723179.8 (Feb. 15, 2022), 10 pages.
Office Action (Non-Final Rejection) dated May 2, 2022 for U.S. Appl. No. 17/068,831 (pp. 1-10).
EPO ISR and WO for PCT/GB2022/050204 (Apr. 7, 2022) (15 pages).
IN 202047026493 Office Action dated Mar. 8, 2022, 6 pages.
https://radiopaedia.org/articles/physical-principles-of-ultrasound-1?lang=GB (Accessed May 29, 2022).
Azad et al., Deep domain adaptation under deep label scarcity. arXiv preprint arXiv:1809.08097 (2018) (Year: 2018).
Wang et al., Few-shot adaptive faster r-cnn. In Proceedings of the IEEE/CVF Conference on Computer Vision and Pattern Recognition, pp. 7173-7182. 2019. (Year: 2019).
Der et al., Inverse kinematics for reduced deformable models. ACM Transactions on graphics (TOG) 25, No. 3 (2006): 1174-1179. (Year: 2006).
Seo et al., "Improved numerical inverse kinematics for human pose estimation," Opt. Eng. 50(3 037001 (Mar. 1, 2011) https://doi.org/10.1117/1.3549255 (Year: 2011).
Boureau et al., "A theoretical analysis of feature pooling in visual recognition." In Proceedings of the 27th international conference on machine learning (ICML-10), pp. 111-118. 2010. (Year: 2010).
Duka, "Neural network based inverse kinematics solution for trajectory tracking of a robotic arm." Procedia Technology 12 (2014) 20-27. (Year: 2014).
Almusawi et al., "A new artificial neural network approach in solving inverse kinematics of robotic arm (denso vp6242)." Computational intelligence and neuroscience 2016 (2016). (Year: 2016).
Dikonomidis et al., "Efficient model-based 3D tracking of hand articulations using Kinect." In BmVC, vol. 1, No. 2, p. 3. 2011. (Year: 2011).
Office Action (Non-Final Rejection) dated May 25, 2022 for U.S. Appl. No. 16/843,281 (pp. 1-28).
Certon, D., Felix, N., Lacaze, E., Teston, F., & Patat, F. (2001). Investigation of cross-coupling in 1-3 piezocomposite arrays. IEEE transactions on ultrasonics, ferroelectrics, and frequency control, 48(1), 85-92.
Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
Desilets, C. S. (1978). Transducer arrays suitable for acoustic imaging (No. GL-2833). Stanford Univ CA Edward L Ginzton Lab of Physics.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In INTER-NOISE and NOISE-CON Congress and Conference Proceedings (vol. 259, No. 4, pp. 5720-5731). Institute of Noise Control Engineering.
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Beranek, L., & Mellow, T. (2019). Acoustics: Sound Fields, Transducers and Vibration. Academic Press.
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Xin Cheng et al, "Computation of the acoustic radiation force on a sphere based on the 3-D FDTD method", Piezoelectricity, Acoustic Waves and Device Applications (SPAWDA), 2010 Symposium on, IEEE, (Dec. 10, 2010), ISBN 978-1-4244-9822-2, pp. 236-239.
Yang Ling et al, "Phase-coded approach for controllable generation of acoustical vortices", Journal of Applied Physics, American Institute of Physics, US, vol. 113, No. 15, ISSN 0021-8979, (Apr. 21, 2013), pp. 154904-154904.
International Preliminary Report on Patentability and Written Opinion issued in corresponding PCT/US2017/035009, dated Dec. 4, 2018, 8 pages.
"Welcome to Project Soli" video, https://atap.google.com/#project-soli Accessed Nov. 30, 2018, 2 pages.
Colgan, A., "How Does the Leap Motion Controller Work?" Leap Motion, Aug. 9, 2014, 10 pages.
Corrected Notice of Allowability dated Jun. 21, 2019 for U.S. Appl. No. 15/966,213 (2 pages).
Damn Geeky, "Virtual projection keyboard technology with haptic feedback on palm of your hand," May 30, 2013, 4 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration" according to Wikipedia, 2 pages., Retrieved Nov. 2018.
EPO Office Action for EP16708440.9 dated Sep. 12, 2018 (7 pages).

(56) References Cited

OTHER PUBLICATIONS

Ex Parte Quayle Action dated Dec. 28, 2018 for U.S. Appl. No. 15/966,213 (pp. 1-7).
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Iddan, et al., "3D Imaging in the Studio (And Elsewhwere . . . " Apr. 2001, 3DV systems Ltd., Yokneam, Isreal, www.3dvsystems.com.il, 9 pages.
International Preliminary Report on Patentability for Application No. PCT/EP2017/069569 dated Feb. 5, 2019, 11 pages.
International Search Report and Written Opinion for Application No. PCT/GB2018/053739, date of mailing Jun. 4, 2019, 16 pages.
Japanese Office Action (with English language translation) for Application No. 2017-514569, dated Mar. 31, 2019, 10 pages.
Kolb, et al., "Time-of-Flight Cameras in Computer Graphics," Computer Graphics forum, vol. 29 (2010), No. 1, pp. 141-159.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD-Technology", A dissertation submitted to Department of EE and CS at Univ. of Siegen, dated Jun. 28, 2000, 223 pages.
Li, Larry, "Time-of-Flight Camera—An Introduction," Texas Instruments, Technical White Paper, SLOA190B—Jan. 2014 Revised May 2014, 10 pages.
Meijster, A., et al., "A General Algorithm for Computing Distance Transforms in Linear Time," Mathematical Morphology and its Applications to Image and Signal Processing, 2002, pp. 331-340.
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 7, 2019 for U.S. Appl. No. 15/851,214 (pp. 1-7).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated May 30, 2019 for U.S. Appl. No. 15/966,213 (pp. 1-9).
Office Action dated Apr. 18, 2019 for U.S. Appl. No. 16/296,127 (pp. 1-6).
Office Action dated Apr. 4, 2019 for U.S. Appl. No. 15/897,804 (pp. 1-10).
Office Action dated Feb. 20, 2019 for U.S. Appl. No. 15/623,516 (pp. 1-8).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated May 16, 2019 for U.S. Appl. No. 15/396,851 (pp. 1-7).
PCT Partial International Search Report for Application No. PCT/GB2018/053404 date of mailing Feb. 25, 2019, 13 pages.
Péter Tamás Kovács et al, "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Schmidt, Ralph, "Multiple Emitter Location and Signal Parameter Estimation" IEEE Transactions of Antenna and Propagation, vol. AP-34, No. 3, Mar. 1986, pp. 276-280.
Search report for PCT/GB2018/051061 dated Sep. 26, 2018 (17 pages).
Search report for PCT/US2018/028966 dated Jul. 13, 2018 (43 pages).
Sixth Sense webpage, http://www.pranavmistry.com/projects/sixthsense/ Accessed Nov. 30, 2018, 7 pages.

Steve Guest et al., "Audiotactile interactions in roughness perception", Exp. Brain Res (2002) 146:161-171, DOI 10.1007/s00221-002-1164-z, Accepted: May 16, 2002/Published online: Jul. 26, 2002, Springer-Verlag 2002, (11 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of- touch-in-virtual-reality/ [retrieved on Feb. 2, 2019] 4 pages.
Xu Hongyi et al, "6-DoF Haptic Rendering Using Continuous Collision Detection between Points and Signed Distance Fields", IEEE Transactions on Haptics, IEEE, USA, vol. 10, No. 2, ISSN 1939-1412, (Sep. 27, 2016), pp. 151-161, (Jun. 16, 2017).
Zeng, Wejun, "Microsoft Kinect Sensor and Its Effect," IEEE Multimedia, Apr.-Jun. 2012, 7 pages.
Office Action dated Aug. 22, 2019 for U.S. Appl. No. 16/160,862 (pp. 1-5).
International Search Report and Written Opinion for Application No. PCT/GB2019/050969, date of mailing Jun. 13, 2019, 15 pages.
Extended European Search Report for Application No. EP19169929.7, dated Aug. 6, 2019, 7 pages.
Office Action dated Oct. 7, 2019 for U.S. Appl. No. 15/396,851 (pp. 1-9).
Office Action dated Oct. 17, 2019 for U.S. Appl. No. 15/897,804 (pp. 1-10).
Corrected Notice of Allowability dated Oct. 31, 2019 for U.S. Appl. No. 15/623,516 (pp. 1-2).
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, DOI: 10.1145/2047196.2047233, ISBN: 978-1-4503-0716-1.
Office Action dated May 18, 2020 for U.S. Appl. No. 15/960,113 (pp. 1-21).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
Takayuki et al., "Noncontact Tactile Display Based on Radiation Pressure of Airborne Ultrasound" IEEE Transactions on Haptics vol. 3, No. 3, p. 165 (2010).
International Search Report and Written Opinion for Application No. PCT/GB2019/052510, date of mailing Jan. 14, 2020, 25 pages.
Partial ISR for Application No. PCT/GB2020/050013 dated May 19, 2020 (16 pages).
Search report for PCT/GB2015/052507 dated Mar. 11, 2020 (19 pages).
Search report for PCT/GB2015/052916 dated Feb. 26, 2020 (18 pages).
Notice of Allowance in U.S. Appl. No. 15/210,661 dated Jun. 17, 2020 (22 pages).
Aoki et al., Sound location of stero reproduction with parametric loudspeakers, Applied Acoustics 73 (2012) 1289-1295 (7 pages).
Bajard et al., BKM: A New Hardware Algorithm for Complex Elementary Functions, 8092 IEEE Transactions on Computers 43 (1994) (9 pages).
Bajard et al., Evaluation of Complex Elementary Functions / A New Version of BKM, SPIE Conference on Advanced Signal Processing, Jul. 1999 (8 pages).
Bortoff et al., Pseudolinearization of the Acrobot using Spline Functions, IEEE Proceedings of the 31st Conference on Decision and Control, Sep. 10, 1992 (6 pages).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Corrected Notice of Allowability dated Jan. 14, 2021 for U.S. Appl. No. 15/897,804 (pp. 1-2).
Georgiou et al., Haptic In-Vehicle Gesture Controls, Adjunct Proceedings of the 9th International ACM Conference on Automotive

(56) References Cited

OTHER PUBLICATIONS

User Interfaces and Interactive Vehicular Applications (AutomotiveUI '17), Sep. 24-27, 2017 (6 pages).
Imaginary Phone: Learning Imaginary Interfaces By Transferring Spatial Memory From a Familiar Device Sean Gustafson, Christian Holz and Patrick Baudisch. UIST 2011. (10 pages).
ISR and WO for PCT/GB2020/050013 (Jul. 13, 2020) (20 pages).
ISR and WO for PCT/GB2020/050926 (Jun. 2, 2020) (16 pages).
Large et al., Feel the noise: Mid-air ultrasound haptics as a novel human-vehicle Interaction paradigm, Applied Ergonomics (2019) (10 pages).
Mueller, GANerated Hands for Real-Time 3D Hand Tracking from Monocular RGB, Eye in-Painting with Exemplar Generative Adverserial Networks, pp. 49-59 (Jun. 1, 2018).
Notice of Allowance dated Jun. 25, 2021 for U.S. Appl. No. 15/396,851 (pp. 1-10).
Notice of Allowance dated Oct. 1, 2020 for U.S. Appl. No. 15/897,804 (pp. 1-9).
Notice of Allowance dated Oct. 16, 2020 for U.S. Appl. No. 16/159,695 (pp. 1-7).
Notice of Allowance dated Oct. 30, 2020 for US App. No. 15/839,184 (pp. 1-9).
Notice of Allowance dated Oct. 6, 2020 for U.S. Appl. No. 16/699,629 (pp. 1-8).
Notice of Allowance dated Sep. 30, 2020 for U.S. Appl. No. 16/401,148 (pp. 1-10).
Office Action dated Dec. 7, 2020 for U.S. Appl. No. 16/563,608 (pp. 1-8).
Office Action dated Jul. 9, 2020 for U.S. Appl. No. 16/228,760 (pp. 1-17).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Mar. 11, 2021 for U.S. Appl. No. 16/228,767 (pp. 1-23).
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Rocchesso et al., Accessing and Selecting Menu Items by In-Air Touch, ACM CHItaly'19, Sep. 23-25, 2019, Padova, Italy (9 pages).
Search Report by EPO for EP 17748466 dated Jan. 13, 2021 (16 pages).
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Teixeira, et al., "A brief introduction to Microsoft's Kinect Sensor," Kinect, 26 pages, retrieved Nov. 2018.
Wang et al., Device-Free Gesture Tracking Using Acoustic Signals, ACM MobiCom '16, pp. 82-94 (13 pages).
Office Action dated Mar. 31, 2021 for U.S. Appl. No. 16/228,760 (pp. 1-21).
ISR and WO for PCT/GB2020/052544 (Dec. 18, 2020) (14 pages).
ISR & WO for PCT/GB2020/052545 (Jan. 27, 2021) 14 pages.
Notice of Allowance dated Apr. 20, 2021 for U.S. Appl. No. 16/563,608 (pp. 1-5).
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Office Action dated May 14, 2021 for U.S. Appl. No. 16/198,959 (pp. 1-6).
Office Action dated May 13, 2021 for U.S. Appl. No. 16/600,500 (pp. 1-9).
ISR for PCT/GB2020/053373 (Mar. 26, 2021) (16 pages).
ISR for PCT/GB2020/052546 (Feb. 23, 2021) (14 pages).
Office Action dated Oct. 31, 2019 for U.S. Appl. No. 15/671,107 (pp. 1-6).
Office Action dated Mar. 20, 2020 for U.S. Appl. No. 15/210,661 (pp. 1-10).
Notice of Allowance dated Jun. 17, 2020 for U.S. Appl. No. 15/210,661 (pp. 1-9).
European Office Action for Application No. EP16750992.6, dated Oct. 2, 2019, 3 pages.
Office Action dated Dec. 11, 2019 for U.S. Appl. No. 15/959,266 (pp. 1-15).
Jager et al., "Air-Coupled 40-KHZ Ultrasonic 2D-Phased Array Based on a 3D-Printed Waveguide Structure", 2017 IEEE, 4 pages.
Wooh et al., "Optimum beam steering of linear phased arays, " Wave Motion 29 (1999) pp. 245-265, 21 pages.
Notice of Allowance dated Feb. 10, 2020, for U.S. Appl. No. 16/160,862 (pp. 1-9).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 29, 2020 for U.S. Appl. No. 16/198,959 (p. 1-6).
Office Action dated Jan. 10, 2020 for U.S. Appl. No. 16/228,767 (pp. 1-6).
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine earning, Lille, France, 2015, JMLR: W&CP vol. 37, copyright 2015 by the author(s), 11 pages.
Ashish Shrivastava et al., Learning from Simulated and Unsupervised Images through Adversarial Training, Jul. 19, 2017, pp. 1-16.
Konstantinos Bousmalis et al., Domain Separation Networks, 29th Conference on Neural Information Processing Sysgtems (NIPS 2016), Barcelona, Spain. Aug. 22, 2016, pp. 1-15.
Eric Tzeng et al., Adversarial Discriminative Domain Adaptation, Feb. 17, 2017, pp. 1-10.
David Joseph Tan et al., Fits like a Glove: Rapid and Reliable Hand Shape Personalization, 2016 IEEE Conference on Computer Vision and Pattern Recognition, pp. 5610-5619.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Toby Sharp et al., Accurate, Robust, and Flexible Real-time Hand Tracking, CHI '15, Apr. 18-23, 2015, Seoul, Republic of Korea, ACM 978-1-4503-3145-6/15/04, pp. 1-10.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
GitHub—IntelRealSense/hand_tracking_samples: researc codebase for depth-based hand pose estimation using dynamics based tracking and CNNs, Mar. 26, 2020, 3 pages.
Stan Melax et al., Dynamics Based 3D Skeletal Hand Tracking, May 22, 2017, pp. 1-8.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, NY, USA, 2016, JMLR: W&CP vol. 48.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Sergey Ioffe et al., Batch Normalization: Accelerating Deep Network Training by Reducing Internal Covariat Shift, Mar. 2, 2015, pp. 1-11.
Diederik P. Kingma et al., Adam: A Method for Stochastic Optimization, Jan. 30, 2017, pp. 1-15.
Christoper M. Bishop, Pattern Recognition and Machine Learning, 2006, pp. 1-758.

(56) References Cited

OTHER PUBLICATIONS

Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Mahdi Rad et al., Feature Mapping for Learning Fast and Accurate 3D Pose Inference from Synthetic Images, Mar. 26, 2018, pp. 1-14.
Jonathan Tompson et al., Real-Time Continuous Pose Recovery of Human Hands Using Convolutional Networks, ACM Trans. Graph. 33, 5, Article 169, Aug. 2014, pp. 1-10.
Vincent Lepetit et al., Model Based Augmentation and Testing of an Annotated Hand Pose Dataset, ResearchGate, https://www.researchgate.net/publication/307910344, Sep. 2016, 13 pages.
Shome Subhra Das, Detection of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Marin, About LibHand, LibHand—A Hand Articulation Library, www.libhand.org/index.html, Mar. 26, 2020, pp. 1-2; www.ibhand.org/download.html, 1 page; www.libhand.org/examples.html, pp. 1-2.
GitHub—danfis/libccd: Library for collision detection between two convex shapes, Mar. 26, 2020, pp. 1-6.
OGRECave/ogre—GitHub: ogre/Samples/Media/materials at 7de80a7483f20b50f2b10d7ac6de9d9c6c87d364, Mar. 26, 2020, 1 page.
Shanxin Yuan et al., BigHand2.2M Bechmark: Hand Pose Dataset and State of the Art Analysis, Dec. 9, 2017, pp. 1-9.
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Notice of Allowance dated Apr. 22, 2020 for U.S. Appl. No. 15/671,107 (pp. 1-5).
Office Action dated Apr. 17, 2020 for U.S. Appl. No. 16/401,148 (pp. 1-15).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Nina Gaissert, Christian Wallraven, and Heinrich H. Bulthoff, "Visual and Haptic Perceptual Spaces Show High Similarity in Humans", published to Journal of Vision in 2010, available at http://www.journalofvision.org/content/10/11/2 and retrieved on Apr. 22, 2020 ( Year: 2010), 20 pages.
Hua J, Qin H., Haptics-based dynamic implicit solid modeling, IEEE Trans Vis Comput Graph. Sep.-Oct. 2004;10 (5):574-86.
Hilleges et al. Interactions in the air: adding further depth to interactive tabletops, UIST '09: Proceedings of the 22nnd annual ACM symposium on User interface software and technologyOct. 2009 pp. 139-148.
International Search Report and Written Opinion for Application No. PCT/GB2019/051223, date of mailing Aug. 8, 2019, 15 pages.
Partial International Search Report for Application No. PCT/GB2018/053735, date of mailing Apr. 12, 2019, 14 pages.
International Search Report and Written Opinion for Application No. PCT/GB2018/053738, date of mailing Apr. 11, 2019, 14 pages.
Al-Mashhadany, "Inverse Kinematics Problem (IKP) of 6-DOF Manipulator by Locally Recurrent Neural Networks (LRNNs)," Management and Service Science (MASS), International Conference on Management and Service Science., IEEE, Aug. 24, 2010, 5 pages. (Year: 2010).
Guez, "Solution to the inverse kinematic problem in robotics by neural networks." In Proceedings of the 2nd International Conference on Neural Networks, 1988. San Diego, California. (Year: 1988) 8 pages.
Invitation to Pay Additional Fees for PCT/GB2022/051821 (Oct. 20, 2022), 15 pages.
Mahboob, "Artificial neural networks for learning inverse kinematics of humanoid robot arms." MS Thesis, 2015. (Year: 2015) 95 pages.
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Final Rejection) dated Dec. 15, 2022 for U.S. Appl. No. 16/843,281 (pp. 1-25).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
"Flexible piezoelectric transducer for ultrasonic inspection of non-planar components." Ultrasonics 48.5 (2008): 367-375.
Andre J. Duerinckx, Matched gaussian apodization of pulsed acoustic phased arrays, Ultrasonic Imaging, vol. 2, Issue 4, Oct. 1980, pp. 338-369.
Cappellari et al., "Identifying Electromyography Sensor Placement using Dense Neural Networks." In DATA, pp. 130-141. 2018. ( Year: 2018).
EPO Examination Report for EP19769198.3 (Jul. 11, 2023) 9 pages.
Examination Report for EP 17 826 539.3 (Aug. 2, 2023) (5 pages).
First Examination report for ndian Patent Application No. 202247024128 (Aug. 11, 2023) (6 pages).
IL OA for IL 278402 (Nov. 29, 2023) 4 pages.
Inoue, A Pinchable Aerial Virtual Sphere by Acoustic Ultrasound Stationary Wave, IEEE (Year: 2014) 4 pages.
ISR and WO for PCT/GB2023/050001 (May 24, 2023) (20 pages).
ISR and WO for PCT/GB2023/052122 (Oct. 18, 2023) 13 pages.
ISR and WO for PCT/GB2023/052612 (Mar. 7, 2024) 18 pages.
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE) João Pessoa, Brazil, 2018, pp. 333-338 (Year: 2018).
Nuttall, A. (Feb. 1981). Some windows with very good sidelobe behavior. IEEE Transactions on Acoustics, Speech, and Signal Processing. 8 pages.
Ochiai, Cross-Field Aerial Haptics: Rendering Haptic Feedback in Air with Light and Acoustic Fields, CHI (Year: 2016) 10 pages.
Office Action (Ex Parte Quayle Action) dated Jul. 20, 2023 for U.S. Appl. No. 16/843,281 (pp. 1-15).
Office Action (Ex Parte Quayle Action) dated Sep. 18, 2023 for U.S. Appl. No. 18/066,267 (pp. 1-6).
Office Action (Final Rejection) dated Jul. 25, 2023 for U.S. Appl. No. 17/454,823 (pp. 1-17).

(56) References Cited

OTHER PUBLICATIONS

Office Action (Final Rejection) dated Aug. 30, 2023 for U.S. Appl. No. 16/564,016 (pp. 1-15).
Office Action (Non-Final Rejection) dated Jan. 19, 2024 for U.S. Appl. No. 18/305,354 (pp. 1-4).
Office Action (Non-Final Rejection) dated Feb. 1, 2024 for U.S. Appl. No. 17/835,411 (pp. 1-7).
Office Action (Non-Final Rejection) dated Mar. 14, 2024 for U.S. Appl. No. 18/188,584 (pp. 1-5).
Office Action (Non-Final Rejection) dated Mar. 28, 2024 for U.S. Appl. No. 18/359,951 (pp. 1-5).
Office Action (Non-Final Rejection) dated Sep. 7, 2023 for U.S. Appl. No. 16/144,474 (pp. 1-16).
Office Action (Non-Final Rejection) dated Sep. 28, 2023 for U.S. Appl. No. 16/995,819 (pp. 1-8).
Office Action (Non-Final Rejection) dated Oct. 3, 2023 for U.S. Appl. No. 18/303,386 (pp. 1-18).
Office Action (Notice of Allowance and Fees Due (PTOL-85)) dated Jan. 31, 2024 for U.S. Appl. No. 18/352,981 (pp. 1-6).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Jun. 16, 2023 for U.S. Appl. No. 17/354,636 (pp. 1-7).
Office Action (Notice of Allowance and Fees Due (PTOL-85)) dated Jul. 20, 2023 for U.S. Appl. No. 17/692,852 (pp. 1-8).
Office Action (Notice of Allowance and Fees Due (PTOL-85)) dated Aug. 2, 2023 for U.S. Appl. No. 16/843,281 (pp. 1-5).
Office Action (Notice of Allowance and Fees Due (PTOL-85)) dated Aug. 8, 2023 for U.S. Appl. No. 17/645,305 (pp. 1-8).
Office Action (Notice of Allowance and Fees Due (PTOL-85)) dated Sep. 11, 2023 for U.S. Appl. No. 18/065,603 (pp. 1-11).
Office Action (Notice of Allowance and Fees Due (PTOL-85)) dated Oct. 12, 2023 for U.S. Appl. No. 18/066,267 (pp. 1-5).
Office Action (Notice of Allowance and Fees Due (PTOL-85)) dated Oct. 18, 2023 for U.S. Appl. No. 17/477,536 (pp. 1-8).
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).
Papoulis, A. (1977). Signal Analysis. The University of Michigan: McGraw-Hill, pp. 92-93.
Prabhu, K. M. (2013). Window Functions and Their Applications in Signal Processing . CRC Press., pp. 87-127.
Schiefler, Generation and Analysis of Ultrasound Images Using Plane Wave and Sparse Arrays Techniques, Sensors (Year: 2018) 23 pages.
Smart Interface: Piezo Components with Flexible Printed Circuit Boards, www.physikinstrumente.co.uk/en/products/piezo-ceramic-components-transducers-for-oems/smart-interface/ (accessed Sep. 11, 2023) 5 pages.
Notice of Allowance dated Jun. 10, 2021 for U.S. Appl. No. 17/092,333 (pp. 1-9).
Office Action dated Jun. 25, 2021 for U.S. Appl. No. 16/899,720 (pp. 1-5).
Corrected Notice of Allowability dated Aug. 9, 2021 for U.S. Appl. No. 15/396,851 (pp. 1-6).
Notice of Allowance dated Jul. 22, 2021 for U.S. Appl. No. 16/600,500 (pp. 1-9).
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Office Action dated Aug. 10, 2021 for U.S. Appl. No. 16/564,016 (pp. 1-14).
Office Action dated Aug. 9, 2021 for U.S. Appl. No. 17/068,825 (pp. 1-9).
Office Action dated Aug. 19, 2021 for U.S. Appl. No. 17/170,841 (pp. 1-9).
Office Action dated Sep. 16, 2021 for U.S. Appl. No. 16/600,496 (pp. 1-8).
Office Action dated Sep. 24, 2021 for U.S. Appl. No. 17/080,840 (pp. 1-9).
Ryoko Takahashi, Tactile Stimulation by Repetitive Lateral Movement of Midair Ultrasound Focus, Journal of Atex Class Files, vol. 14, No. 8, Aug. 2015.
Hyunjae Gil, Whiskers: Exploring the Use of Ultrasonic Haptic Cues on the Face, CHI 2018, Apr. 21-26, 2018, Montréal, QC, Canada.
Kai Tsumoto, Presentation of Tactile Pleasantness Using Airborne Ultrasound, 2021 IEEE World Haptics Conference (WHC) Jul. 6-9, 2021. Montreal, Canada.
Keisuke Hasegawa, Electronically steerable ultrasound-driven long narrow air stream, Applied Physics Letters 111, 064104 (2017).
Keisuke Hasegawa,, Curved acceleration path of ultrasound-driven air flow, J. Appl. Phys. 125, 054902 (2019).
Keisuke Hasegawa, Midair Ultrasound Fragrance Rendering, IEEE Transactions on Visualization and Computer Graphics, vol. 24, No. 4, Apr. 2018 1477.
Takaaki Kamigaki, Noncontact Thermal and Vibrotactile Display Using Focused Airborne Ultrasound, EuroHaptics 2020, LNCS 12272, pp. 271-278, 2020.
Mohamed Yacine Tsalamlal, Affective Communication through Air Jet Stimulation: Evidence from Event-Related Potentials, International Journal of Human-Computer Interaction 2018.
Amanda Zimmerman, The gentle touch receptors of mammalian skin, Science, Nov. 21, 2014, vol. 346 Issue 6212, p. 950.
A. B. Vallbo, Receptive field characteristics of tactile units with myelinated afferents in hairy skin of human subjects, Journal of Physiology (1995), 483.3, pp. 783-795.
Henrik Bruus, Acoustofluidics 2: Perturbation theory and ultrasound resonance modes, Lab Chip, 2012, 12, 20-28.
Tomoo Kamakura, Acoustic streaming induced in focused Gaussian beams, J. Acoust. Soc. Am. 97 (5), Pt. 1, May 1995 p. 2740.
Mitsuru Nakajima, Remotely Displaying Cooling Sensation via Ultrasound-Driven Air Flow, Haptics Symposium 2018, San Francisco, USA p. 340.
Line S Loken, Coding of pleasant touch by unmyelinated afferents in humans, Nature Neuroscience vol. 12 [ No. 5 [ May 2009 547.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Rochelle Ackerley, Human C-Tactile Afferents Are Tuned to the Temperature of a Skin-Stroking Caress, J. Neurosci., Feb. 19, 2014, 34(8):2879-2883.
India Morrison, The skin as a social organ, Exp Brain Res (2010) 204:305-314.
Mariana von Mohr, The soothing function of touch: affective touch reduces feelings of social exclusion, Scientific Reports, 7: 13516, Oct. 18, 2017.
Jonaschatel-Goldman, Touch increases autonomic coupling between romantic partners, Frontiers in Behavioral Neuroscience Mar. 2014, vol. 8, Article 95.
Uta Sailer, How Sensory and Affective Attributes Describe Touch Targeting C-Tactile Fibers, Experimental Psychology (2020), 67(4), 224-236.
EPO Examination Search Report 17 702 910.5 (Jun. 23, 2021).
Office Action dated Oct. 29, 2021 for U.S. Appl. No. 16/198,959 (pp. 1-7).
Notice of Allowance dated Nov. 5, 2021 for U.S. Appl. No. 16/899,720 (pp. 1-9).
Corrected Notice of Allowability dated Nov. 24, 2021 for U.S. Appl. No. 16/600,500 (pp. 1-5).
International Search Report and Written Opinion for App. No. PCT/GB2021/051590, dated Nov. 11, 2021, 20 pages.
Anonymous: "How does Ultrahaptics technology work? –Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].

(56) References Cited

OTHER PUBLICATIONS

Office Action (Notice of Allowance and Fees Due (PTOL-85)) dated Dec. 14, 2021 for U.S. Appl. No. 17/170,841 (pp. 1-8).
Office Action (Non-Final Rejection) dated Dec. 20, 2021 for U.S. Appl. No. 17/195,795 (pp. 1-7).
EPO Application 18 725 358.8 Examination Report Dated Sep. 22, 2021.
EPO 21186570.4 Extended Search Report dated Oct. 29, 2021.
Office Action (Notice of Allowance and Fees Due (PTOL-85)) dated Jan. 18, 2022 for U.S. Appl. No. 16/899,720 (pp. 1-2).
Office Action (Non-Final Rejection) dated Jan. 24, 2022 for U.S. Appl. No. 16/228,767 (pp. 1-22).
Office Action (Non-Final Rejection) dated Jan. 21, 2022 for U.S. Appl. No. 17/068,834 (pp. 1-12).
Office Action (Notice of Allowance and Fees Due (PTOL-85)) dated Feb. 11, 2022 for U.S. Appl. No. 16/228,760 (pp. 1-8).
ISR and WO for PCT/GB2020/052829 (Feb. 10, 2021) (15 pages).
EPO Examination Report 17 748 4656.4 (Jan. 12, 2021) (16 pages).
Office Action (Notice of Allowance and Fees Due (PTOL-85)) dated Feb. 28, 2022 for U.S. Appl. No. 17/068,825 (pp. 1-7).
Mohamed Yacine Tsalamlal, Non-Intrusive Haptic Interfaces: State-of-the Art Survey, HAID 2013, LNCS 7989, pp. 1-9, 2013.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Gavrilov L R et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Pompei, F.J. (2002), "Sound from Ultrasound: The Parametric Array as an Audible Sound Source", Massachusetts Institute of Technology (132 pages).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hoshi T et al, "Noncontact Tactile Display Based on Radiation Pressure of Airborne Ultrasound", IEEE Transactions on Haptics, IEEE, USA, (20100701), vol. 3, No. 3, ISSN 1939-1412, pp. 155-165.
Yoshino, K. and Shinoda, H. (2013), "Visio Acoustic Screen for Contactless Touch Interface with Tactile Sensation", University of Tokyo (5 pages).
Kamakura, T. and Aoki, K. (2006) "A Highly Directional Audio System using a Parametric Array in Air" WESPAC IX 2006 (8 pages).
Alexander, J. et al. (2011), Adding Haptic Feedback to Mobile TV (6 pages).
Tom Carter et al, "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Search Report for GB1308274.8 dated Nov. 11, 2013. (2 pages).
Iwamoto T et al, "Two-dimensional Scanning Tactile Display using Ultrasound Radiation Pressure", Haptic Interfaces for Virtual Environment and Teleoperator Systems, 2006 14th Symposium on Alexandria, VA, USA Mar. 25-26, 2006, Piscataway, NJ, USA, IEEE, (Mar. 25, 2006), ISBN 978-1-4244-0226-7, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015 (12 pages).

Marzo et al., Holographic acoustic elements for manipulation of levitated objects, Nature Communications DOI: 10.1038/ncomms9661 (2015) (7 pages).
Search report for PCT/GB2014/051319 dated Dec. 8, 2014 (4 pages).
Search Report for GB1415923.0 dated Mar. 11, 2015. (1 page).
Marshall, M ., Carter, T., Alexander, J., & Subramanian, S. (2012). Ultratangibles: creating movable tangible objects on Interactive tables. In Proceedings of the 2012 ACM annual conference on Human Factors in Computing Systems, (pp. 2185-2188).
Obrist et al., Talking about Tactile Experiences, CHI 2013, Apr. 27-May 2, 2013 (10 pages).
Benjamin Long et al, "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Freeman et al., Tactile Feedback for Above-Device Gesture Interfaces: Adding Touch to Touchless Interactions CMI'14, Nov. 12-16, 2014, Istanbul, Turkey (8 pages).
Obrist et al., Emotions Mediated Through Mid-Air Haptics, CHI 2015, Apr. 18-23, 2015, Seoul, Republic of Korea. (10 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Phys.org, Touchable Hologram Becomes Reality, Aug. 6, 2009, by Lisa Zyga (2 pages).
Iwamoto et al., Airborne Ultrasound Tactile Display: Supplement, The University of Tokyo 2008 (2 pages).
Hoshi, T., Development of Aerial-Input and Aerial-Tactile-Feedback System, IEEE World Haptics Conference 2011, p. 569-573.
EPSRC Grant summary EP/J004448/1 (2011) (1 page).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Tom Nelligan and Dan Kass, Intro to Ultrasonic Phased Array (date unknown) (8 pages).
Light, E.D., Progress in Two Dimensional Arrays for Real Time Volumetric Imaging, 1998 (17 pages).
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009. (1 page).
Sylvia Gebhardt, Ultrasonic Transducer Arrays for Particle Manipulation (date unknown) (2 pages).
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Oscar Martínez-Graullera et al, "2D array design based on Fermat spiral for ultrasound imaging", Ultrasonics, (Feb. 1, 2010), vol. 50, No. 2, ISSN 0041-624X, pp. 280-289, XP055210119.
Search Report for PCT/GB2017/052332 dated Oct. 10, 2017 (12 pages).
Canada Application 2,909,804 Office Action dated Oct. 18, 2019, 4 pages.
A. Sand, Head-Mounted Display with Mid-Air Tactile Feedback, Proceedings of the 21st ACM Symposium on Virtual Reality Software and Technology, Nov. 13-15, 2015 (8 pages).
E. Bok, Metasurface for Water-to-Air Sound Transmission, Physical Review Letters 120, 044302 (2018) (6 pages).
K. Jia, Dynamic properties of micro-particles in ultrasonic transportation using phase-controlled standing waves, J. Applied Physics 116, n. 16 (2014) (12 pages).

(56) References Cited

OTHER PUBLICATIONS

Marco A B Andrade et al, "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
M. Barmatz et al, "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Search Report for PCT/GB/2017/053729 dated Mar. 15, 2018 (16 pages).
Search Report for PCT/GB/2017/053880 dated Mar. 21, 2018. (13 pages).
ISR & WO for PCT/GB2022/051388 (Aug. 30, 2022) (15 pages).
Office Action (Final Rejection) dated Sep. 16, 2022 for U.S. Appl. No. 16/404,660 (pp. 1-6).
Office Action (Non-Final Rejection) dated Aug. 29, 2022 for U.S. Appl. No. 16/995,819 (pp. 1-6).
Office Action (Non-Final Rejection) dated Sep. 21, 2022 for U.S. Appl. No. 17/721,315 (pp. 1-10).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Notice of Allowance and Fees Due (PTOL-85)) dated Sep. 7, 2022 for U.S. Appl. No. 17/068,834 (pp. 1-8).
Office Action (Notice of Allowance and Fees Due (PTOL-85)) dated Sep. 8, 2022 for U.S. Appl. No. 17/176,899 (pp. 1-8).
Office Action (Notice of Allowance and Fees Due (PTOL-85)) dated Sep. 12, 2022 for U.S. Appl. No. 16/734,479 (pp. 1-7).
Chang Suk Lee et al., An electrically switchable visible to infra-red dual frequency cholesteric liquid crystal light shutter. J. Mater. Chem. C, 2018, 6, 4243 (7 pages).

\* cited by examiner

CONTROL POINT MANIPULATION TECHNIQUES IN HAPTIC SYSTEMS

PRIOR APPLICATIONS

This application claims the benefit of the following three applications, all of which are incorporated by references in their entirety
(1) U.S. Provisional Patent Application No. 63/221,937 filed on Jul. 15, 2021;
(2) U.S. Provisional Patent Application No. 63/223,067, filed on Jul. 19, 2021; and
(3) U.S. Provisional Patent Application No. 63/232,599, filed on Aug. 12, 2021.

FIELD OF THE DISCLOSURE

The present disclosure relates generally to improved techniques in control point manipulation techniques in mid-air haptic systems.

BACKGROUND

A continuous distribution of sound energy, which will refer to as an "acoustic field", can be used for a range of applications including haptic feedback in mid-air, sound-from-ultrasound systems and producing encoded waves for tracking systems.

By defining one of more control points in space, the acoustic field can be controlled. Each point can be assigned a value equating to a desired amplitude at the control point. A physical set of transducers can then be controlled to create an acoustic field exhibiting the desired amplitude at the control points.

Nevertheless, there are situations in which the number of control points must be changed. Examples include moving from zero to many control points, as well as adding or removing control points. Solving for the control points involves producing a specific value of a complex-valued linear acoustic quantity (which may be acoustic pressure or an acoustic particle velocity in a chosen direction) at a point in space. If the solution of the system for the production of an acoustic field is in a loop to generate sequential solutions, it is important to maintain temporal coherence in successive acoustic fields. Failing to maintain temporal coherence in the context of an ultrasonic phased array, means the production of popping and clicking artifacts due to non-linear interactions that produce audible sound. This disrupts the user experience in the setting of a mass-market commercial device.

In most situations, judicious use of interpolation in the set of target acoustic quantities for the control points and control point locations and properties can be used to enforce temporal coherence among the solution set. However, the generation of a new control point in particular creates a paradoxical situation in the solution space. The addition of a new degree of freedom may have repercussions that generate instantaneous change in the solution at the other control points. As this causes the composition of how the waves coalesce to form other control points to jump, other places in the field away from the control points may experience discontinuities due to the sudden difference. This gives rise to audible sound. The sound is due to the counterintuitive difference between enforcing zero amplitude at a point and the absence of restriction being distinct states, as any abrupt switch generates unwanted noise. Therefore, methods to smoothly generate movement from one state to the other minimizing unwanted noise would be of commercial value.

Solution methods for obtaining the drive conditions for the phased array are based on solving complex-valued systems of equations, using standard linear algebra techniques. As these are exactly-solving equations, an exact result is derived for each sample of the waveform expressed at each control point in a single step. Previously, when an extra degree of freedom is added, the right-hand-side has been set to zero. As is shown in FIG. 1, described further below, this corresponds to a jump in the field which results in audible noise, which is unwanted in the context of a commercial device.

Further, when a control point is defined in the acoustic field outside the point of control, it fluctuates. This is shown in FIG. 4, described below. This fluctuating field can interfere with other equipment, which can be an obstacle to the commercialization of acoustic field technology, including ultrasonic haptic feedback in mid-air.

When a focused high acoustic pressure control point is created the ultrasonic transducers interfere constructively at the focus point given. Approximating with equal pressure, the pressure is then pN where N transducers interfere each adding p pressure to the point. Away from the point, the phasors from each transducer may be modelled as interfering randomly, yielding an approximate expected value of p$\sqrt{N}$ for the pressure. Given that this makes the energy deposition densities $p^2N^2$ and $p^2N$, this therefore means that the difference in energy deposition is then N. Therefore, for these assumptions, to reduce the interference by a factor of N, the count of the transducer elements must increase by N.

Random interference cannot be used to reduce the energy density beyond the focus, because this corresponds to energy that was previously focused, so it must exist given the focus exists. This makes it difficult to limit the field in this location, but in the case of ultrasonic haptic feedback in mid-air, since the ultrasonic transducers are driven conditionally upon the presence of a body part to detect the field through the sense of touch, this can be modelled as a reflecting plane cutting through the field and the focus point.

The system (shown in FIG. 5, described further below) can then be roughly modelled analogously to a lens system undergoing a series of perfect reflections, whereby given a transducer array dimension L, with area $L^2$ the system focusses energy to a point, which is cut by the user and thus reflected, becoming again of dimension L and thus spread over an area $L^2$ at the array, reflecting a second time back up to the plane of the user hand, where the dimension of the energy spread is then 2L with an area $4L^2$. Assuming the area of the focal spot is $F^2$, to reduce the energy density in the second reflection by a factor of N, the transducer array area must satisfy:

$$N = \frac{4L^2}{F^2},$$

Using these approximate calculations, it can be appreciated that to create a contrast of 50 dB between the focus and the fluctuating field for example, an energy density difference ratio of 100,000:1, there must be approximately 100,000 transducer elements and the ratio of the focal spot area to transducer array area must be approximately 4:100,000. Assuming that for a wavelength of $\lambda$, the focal spot area is approximately $\lambda^2$ and the elements are separated by and have a diameter of $\lambda/2$ yielding each having an area $\frac{1}{4}\lambda^2$, as the randomness assumption becomes progressively less applicable on approach and then fails for transducer spacing less than $\lambda/2$, this yields for this example a minimum transducer array area of $25,000\lambda^2$.

So, from this, it may be deduced that very large numbers of transducers, although small, weak and high in carrier frequency, may be required for the next generation of ultrasonic haptic arrays. Therefore, an algorithm that is capable of driving fields generated by these arrays without reference to individual transducers, that is, in constant time with respect to transducer element count, would be commercially valuable.

Further, when attempting to utilize mid-air haptics from a fixed position device within an environment where hand tracking origins may be moving, such as when using virtual reality (VR) or augmented reality (AR) where the hand tracker is attached to a headset, overall positional jitter (slight differences in values due to micromovements caused usually by humans or the tracking system itself being slightly inaccurate), and uncertainties regarding the colocation of the mid-air haptic array and the user's hands cannot be completely relied upon. Due to this, the expected and realized output of the mid-air haptic array are often misaligned, generally causing an incorrect output to the hand when trying to target it. This in turn causes mid-air haptics power, both experience and general electricity wise, to be wasted, completely negating any benefits of its additions. In several cases the unexpected missing of these mid-air haptics can produce negative effects as the user may still hear that mid-air haptics are being produced, however are entirely unable to feel them by no fault of their own.

Previous solutions that help mitigate this problem tend to rely on two different principles, either by avoiding a moving tracking device entirely, or by utilizing a second hand tracking device to produce a "ground truth".

The first solution provides a good level of accuracy, however, avoids half of the problem by only allowing the user to see their hands and interact with mid-air haptics within a relatively small interaction zone. Key components of VR and AR allow for the user to move around and interact with objects outside of a standardized "play area".

The second prior solution introduces complexities, where customized extra complexities are introduced at every section of any simulation. Using a second device increases the number of required connected devices to the host machine, increases processing power as two sets of hand trackers must be processed, and will still require prior environment calibration.

The proposed solution herein maintains the flexibility of allowing the user to move around the environment and interact with objects, while only requiring the usage of one single hand-tracking device. Mid-air haptics are still limited to the confinements of the mid-air haptic array's range, however, do not require the user to limit all their interactions to this space. By only utilizing one hand-tracking device, the initial setup complexity and processing power are significantly reduced.

SUMMARY

In this disclosure, a method for blending new control points into the field is described. A more costly but conceptually simpler method, measuring the extant field and recreating a copy of that field interpolated with the actually desired value at a new control point is first described. The next method described with a more concise implementation may be characterized as the introduction of an opacity, interaction or blending coefficient which allows the degree of freedom represented by a new control point to be incrementally added to the field, smoothing its effect on the output generated by the physical device.

Further, traditionally predicting the output of phased array systems involves taking each element and evaluating its contribution to the field. When focusing phased arrays, predicting the output and the fringing field is necessary for multipoint focusing and acoustic cloaking applications. As the transducer density tends towards the critical spacing of the phased elements, their emitted field tends towards a continuous function. By considering the whole acoustic field as a single continuous function and evaluating the system parameterized in focal point location and sample point location, the acoustic properties of the system may be evaluated as a smooth high-dimensional function that admits approximations. A realization of such an approach wherein a neural network admitting automatic differentiation is trained to approximate this function with fixed computation cost, is described. In the limit of a large enough number of discrete transducer elements, the evaluation of a single approximation will inevitably outperform even a linear summation (whose computational cost must scale linearly) over the linear acoustic properties of the elements.

Further, to resolve the misalignment of expected and realized output of the mid-air haptic array, interactable objects are subdivided into customizable, uniform, intersection "regions" that are then used to compute a volume of 3D positions in which the haptic focal point is then moved between. Positions can be produced and assigned in different ways, and volumes can be produced from any object as long as they have their regions pre-computed. Rather than directly targeting the hand of the user, the virtual intersection of the hand are used and these regions create a generally larger volume in which mid-air haptics can be produced.

BRIEF DESCRIPTION OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
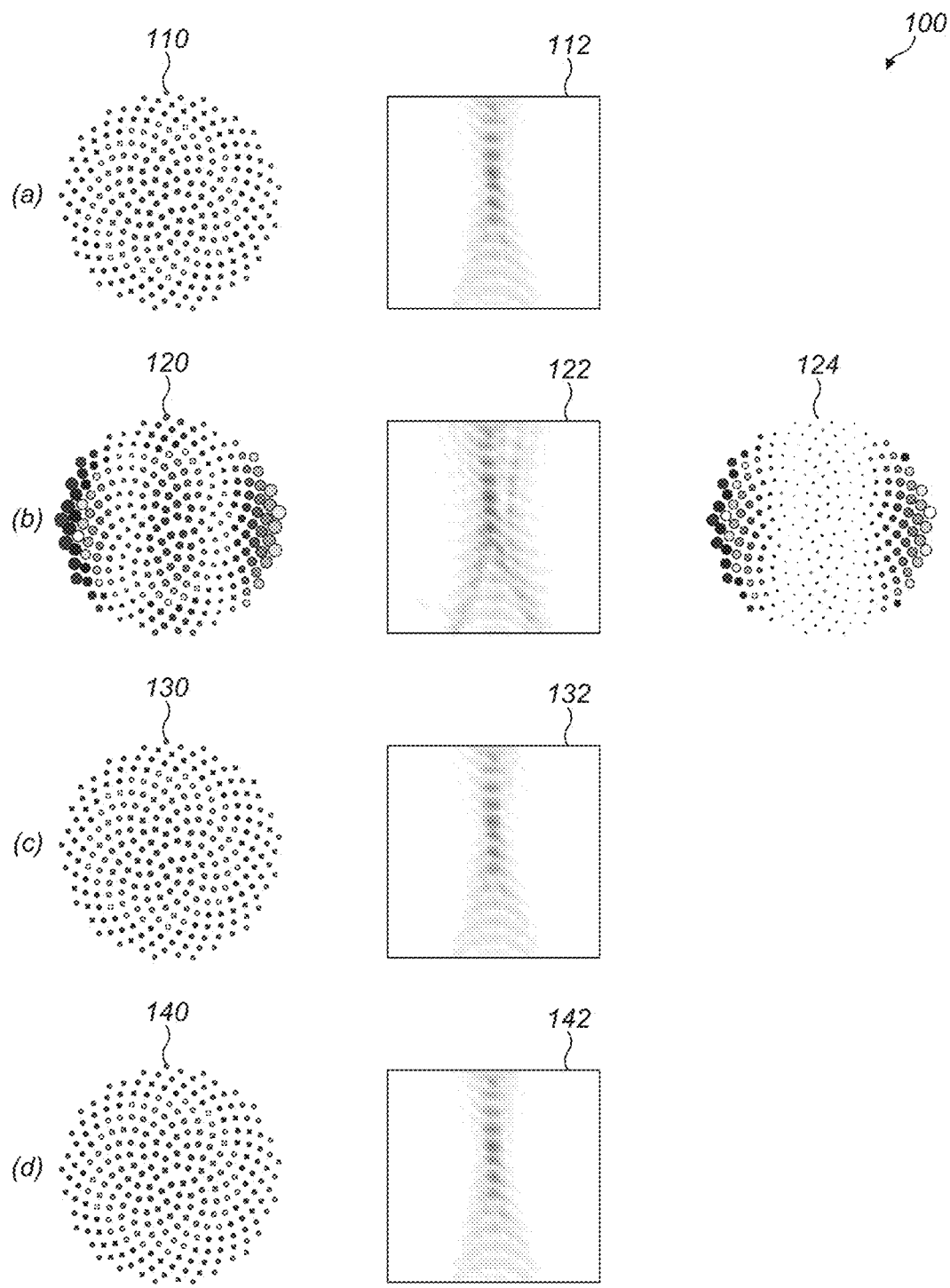
FIG. 1 shows a schematic of adding two new control points to a single control point system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Control Point Blending

A. Reduced Representation—Using Per-Focus Basis Functions

Traditionally, the linear system is described in terms of linear combinations of complex-valued transducer generated fields and their drive coefficients. This produces a matrix, where for m control points and N transducers, the matrix A is N columns by m rows and consists of the generated complex valued signal by each transducer $q \in \{1, \ldots, N\}$ at the location of each control point $j \in \{1, \ldots, m\}$. Previous work (US 2016/0124080) has generated increased power efficiency by adding regularization to this matrix A, but regularization increases the size of the matrix and thus the compute requirements to solve the system significantly.

Using $\alpha_q(\mathcal{X}_j)$ to describe a complex-valued scalar linear acoustic quantity a measured at a position offset from the transducer element q by the translation vector $\mathcal{X}_j$, which may evaluate to be acoustic pressure or an acoustic particle velocity in a chosen direction, the matrix A may be written:

$$A = \begin{bmatrix} \alpha_1(\mathcal{X}_1) & \cdots & \alpha_N(\mathcal{X}_1) \\ \vdots & \ddots & \vdots \\ \alpha_N(\mathcal{X}_m) & \cdots & \alpha_N(\mathcal{X}_m) \end{bmatrix},$$

This, for a number of control points fewer than the number of acoustically active transducer elements can then be placed into a complex-valued linear system wherein a sample vector $b = \{\alpha_1(\mathcal{X}_1), \ldots, \alpha_m(\mathcal{X})\}$ represents the desired total linear scalar complex-valued acoustic quantity where the amplitudes are desired amplitudes of the acoustic quantity and the phases are those taken from the phase oracle (which may have been user-influenced). In this linear system described as Ax=b, the x vector is then the initial field coefficients for each transducer element, which may be used to drive a real transducer element, resulting in the recreation of the acoustic field desired. This may then be solved in a loop to provide a system that changes over time.

As this is matrix A is not square, and the degrees of freedom number more than the constraints, this is termed a 'minimum norm' system. It is 'minimum norm' because as there are infinitely many solutions, the most expeditious solution is the one which achieve the correct answer using the least 'amount' of x–the solution x with minimum norm. To achieve this, some linear algebra is used to create a square system from the minimum norm system Ax=b.

$A^H A x = A^H b$ $(A^H A)^{-1} A^H A x = x = (A^H A)^{-1} A^H b,$

This $A^H A$ is now N columns by N rows and given that the number of transducers is often very large this is an equivalently large matrix, and since any solution method must invert it, with it, this is not an efficient method. A more accessible approach is to create a substitution $A^H z = x$, before applying a similar methodology:

$Cz = A A^H z = A x = b,$ $z = C^{-1} b = (A A^H)^{-1} b,$

This time around, as $C = A A^H$ is a mere m columns by m rows, this result is a much smaller set of linear equations to work through. The vector z can be converted into x at any time so long as $A^H$ can be produced. $A^H$ may be interpreted as a set of complex-valued basis vectors whose components in turn each describe a scalable portion of the drive of each transducer that is applicable to the $j^{th}$ control point, although the matrix is defined in terms of the forward propagation of a linear acoustic quantity. For this reason, elements of $A^H$ may always be weighted by a real weighting coefficient to rearrange the priority with which each transducer is used to create the $j^{th}$ control point.

However, this does not end here. This approach is not just a fortuitous set of symbolic manipulations, the change of variables from the complex-valued vector that describes the drive of individual transducer elements x to the much lower dimensional z has further meaning. Each complex-valued component of z can be viewed as a complex-valued drive coefficient that pre-multiplies a focusing function which generates a focus from all of the individual transducer fields, wherein the focal point is co-located with each individual control point. For m control points therefore, there are m such focusing functions, and they can be viewed as defining a complex vector space $\mathbb{C}^m$ where points in this space correspond to possible configurations of these m 'focus points'.

B. Simulating Acoustic Measurements to Minimize Field Perturbation

The acoustic field may be measured in simulation to provide the linear complex-valued acoustic quantities (such as acoustic pressure or particle velocity of the medium instantaneously at the carrier frequency). Placing the measured values into the b vector of newly added control points allows these extra degrees of freedom to be added to the system without perturbing the existing acoustic field. Then, to move the field from the measured configuration to the desired value, an interpolation that cross-fades the existing acoustic field into the new desired signal can be realized.

This can be achieved by defining a real-valued coefficient for the new control point set where $s \in [0, 1]$. This then defines how much of the new field to use. Generating the acoustic quantities for the new 'temporary' control points $m', \ldots, m$ given the existence of the existing 'permanent' control points $1, \ldots, m-1$, this is:

$$Cz = (1-s) \begin{bmatrix} b_1 \\ \vdots \\ b_{m'-1} \\ \alpha_{\Omega;1, \ldots, m'-1}(\mathcal{X}_{m'}) \\ \vdots \\ \alpha_{\Omega;1, \ldots, m'-1}(\mathcal{X}_m) \end{bmatrix} + sb,$$

where $\alpha_{\Omega;1, \ldots, m'-1}(\mathcal{X}_m)$ for example is the measured acoustic field at the control point m given the first m'−1 pre-existing control points. The calculation to generate this field measurement to begin with may then be written:

$C_{1, \ldots, m'-1} z_{1, \ldots, m'-1} = b_{1, \ldots, m'-1},$ $$z_{padded} = \begin{bmatrix} z_{1, \ldots, m'-1} \\ 0 \\ \vdots \\ 0 \end{bmatrix},$$

-continued $$AA^H z_{padded} = \begin{bmatrix} \alpha_{\Omega;1,\ldots,m'-1}(\chi_1) \\ \vdots \\ \alpha_{\Omega;1,\ldots,m'-1}(\chi_{m'-1}) \\ \alpha_{\Omega;1,\ldots,m'-1}(\chi_{m'}) \\ \vdots \\ \alpha_{\Omega;1,\ldots,m'-1}(\chi_m) \end{bmatrix}.$$

Control points may then be added or removed by adding or removing the points from the temporary points list at an appropriate time. While this approach is conceptually simple, the data movement and extra work required to find the solution to the extra system makes this a difficult approach. Added to that, temporary points must fully progress to being permanently added or permanently deleted before more may be added: a less than ideal solution. However, there is nothing more that can be done to guarantee complete temporal coherence of the system undergoing a change in the number of control points without modification of the underlying solution method to be able to smoothly move between states. A method to apply such a modification would therefore useful, as it could be more efficient than applying a second solution.

C. Modifying the Linear System for Gradated Field Interaction

The control point solution system may be modified to allow for gradated interaction of the acoustic field. The approach taken will be creating an interpolation between a matrix that allows interaction between individual control points and a matrix that prevents these interactions.

It is known that the inverse of a 1×1 matrix is simply the reciprocal of the single value, as the 1×1 identity matrix is just the element 1. It is also known that the inverse of a square matrix with only the diagonal populated by non-zero entries, is another similar matrix with the diagonal elements replaced by the reciprocal of each element—so behaving as a set of many 1×1 matrices whose inverse is causally disconnected. Defining a variant of the square matrix $C=AA^H$, in which all off-diagonal elements have been zeroed as $C_{diag}$ where:

$$C = \begin{bmatrix} \sum_{q=1}^{N} \alpha_q(\chi_1)\overline{\alpha_q(\chi_1)} & \cdots & \sum_{q=1}^{N} \alpha_q(\chi_1)\overline{\alpha_q(\chi_m)} \\ \vdots & \ddots & \vdots \\ \sum_{q=1}^{N} \alpha_q(\chi_m)\overline{\alpha_q(\chi_1)} & \cdots & \sum_{q=1}^{N} \alpha_q(\chi_m)\overline{\alpha_q(\chi_m)} \end{bmatrix},$$

$$C_{diag} = \begin{bmatrix} \sum_{q=1}^{N} \alpha_q(\chi_1)\overline{\alpha_q(\chi_1)} & \cdots & 0 \\ \vdots & \ddots & \vdots \\ 0 & \cdots & \sum_{q=1}^{N} \alpha_q(\chi_m)\overline{\alpha_q(\chi_m)} \end{bmatrix},$$

so therefore $Cz=b$ is a linear system that models a fully-connected set of control points whose fields interact, while $C_{diag}z_{sing.}=b$ is a linear system that models singulated, individual control points whose fields do not interact. A single system that parameterizes the conversion from one to the other would allow a new control to be created that does not interact and smoothly add interactions, or a control point that is interacting and can be smoothly disconnected before it is deleted.

This can be achieved by defining a matrix of real coefficients for each control point $j \in \{1, \ldots m\}$:

$$P = \begin{bmatrix} p_1 & \cdots & 0 \\ \vdots & \ddots & \vdots \\ 0 & \cdots & p_m \end{bmatrix},$$

where $p_j \in [0, 1]$. These are coefficients for each control point j, which correspond to how strongly each point is allowed to interact with the remainder of the acoustic field, where zero is no interaction and one represents fully integrated with the remainder of the solution.

Substituting PA for the modified forward propagation operator and $A^H P^H$ for the modified back propagation operator, effects this change on the linear system, making both operators interpolated from zero. This is then applied to the linear system as:

$$A^H P^H z_{grad} = x_{grad},$$

$$PCP^H z_{grad.} = PAA^H P^H z_{grad.} = PAx_{grad.} = b,$$

Both of the operators are faded into existence to provide smooth interactions with the existing field. However, as $p_j$ tends to zero the matrix becomes singular, as any matrix with a zero row or column is singular:

$$\lim_{p_j \to 0} p_j^2 \sum_{q=1}^{N} \alpha_q(\chi_j)\overline{\alpha_q(\chi_J)} = 0.$$

The solution to this is to ensure that at $p_j=0$, the row and column match the $C_{diag}z_{sing.}=b$ linear system, rather than simply tending to zero. Since the diagonal does not change between the $C_{diag}z_{sing.}=b$ non-interacting system and the $Cz=b$ interacting system, the required step is to ensure that regardless of the value of $p_j$, each diagonal element remains constant.

The final formulation may then be described as:

$$(PCP^H + (I-PP^H)C_{diag})z' = b,$$

where I is the identity matrix and the diagonal components weighted by the diagonal matrix $PP^H$ cancel, leaving just $C_{diag}$ on the diagonal, regardless of the value of $p_j$.

It should be noted that this formulation is Hermitian symmetric, like the original systems. Expanding these as a set of simultaneous linear equations, and comparing the equations in terms of $b_j$.

$$Cz = b \Rightarrow \sum_{k=1}^{m} z_k \left( \sum_{q=1}^{N} \alpha_q(\chi_j)\overline{\alpha_q(\chi_k)} \right) = b_j,$$

$$C_{diag}z_{sing.} = b \Rightarrow z_{j,sing.} \left( \sum_{q=1}^{N} \alpha_q(\chi_J)\overline{\alpha_q(\chi_J)} \right) = b_j,$$

$$PCP^H z_{grad.} = b \Rightarrow p_j \sum_{k=1}^{m} p_k z_{k,grad.} \left( \sum_{q=1}^{N} \alpha_q(\chi_j)\overline{\alpha_q(\chi_k)} \right) = b_j,$$

$$(PCP^H + (I - PP^H)C_{diag})z' = b \Rightarrow$$

-continued $$p_j \sum_{k=1}^{m} p_k z_k' \left( \sum_{q=1}^{N} \alpha_q(\chi_j)\overline{\alpha_q(\chi_k)} \right) + (1-p_j^2)z_j' \left( \sum_{q=1}^{N} \alpha_q(\chi_j)\overline{\alpha_q(\chi_j)} \right) = b_j,$$

Therefore, in the system for z' an m−1 control point system and a separate single control point system may be recovered when $p_j=0$ and the combined m control point system may be recovered when $p_j=1$, and the system is smooth between them, error is introduced to the whole field when any $0 \le p_j < 1$, because the physical system this represents is interdependent. A deeper look at how this error manifests is necessary to understand the effect.

D. Analysis of the Linear System Produced

Intuitively, the approach here involves creating an acoustic model that interacts less than is physical with the system from the perspective of a nascent control point. This can be analyzed by considering how an existing m−1 control point system behaves when a new final row and column are added to the matrix with coefficient $p_m$. Assuming an existing m−1 control point system where $H=(PCP^H+(I-PP^H)C_{diag})$, wherein H is a matrix containing m−1 columns and m−1 rows, with a known inverse $H^{-1}$, a new row and column may be added with coefficient $p_m$ as described. Using the formula for block-wise matrix inversion:

$$\mathcal{H} = \begin{bmatrix} \mathcal{A} & \mathcal{B} \\ \mathcal{C} & \mathcal{D} \end{bmatrix}^{-1} = \begin{bmatrix} \mathcal{A}^{-1} + \mathcal{A}^{-1}\mathcal{B}(\mathcal{D}-\mathcal{C}\mathcal{A}^{-1}\mathcal{B})^{-1}\mathcal{C}\mathcal{A}^{-1} & -\mathcal{A}^{-1}\mathcal{B}(\mathcal{D}-\mathcal{C}\mathcal{A}^{-1}\mathcal{B})^{-1} \\ -(\mathcal{D}-C\mathcal{A}^{-1}B)^{-1}C\mathcal{A}^{-1} & (\mathcal{D}-\mathcal{C}\mathcal{A}^{-1}\mathcal{B})^{-1} \end{bmatrix},$$

where $\mathcal{A}, \mathcal{B}, \mathcal{C}$ and $\mathcal{D}$ are matrix sub-blocks, then setting:

$$\mathcal{H}b = z',$$

$$\mathcal{A} = H,$$

$$\mathcal{B} = p_m \begin{bmatrix} p_1 \left( \sum_{q=1}^{N} \alpha_q(\chi_1)\overline{\alpha_q(\chi_m)} \right) \\ \vdots \\ p_{m-1} \left( \sum_{q=1}^{N} \alpha_q(\chi_{m-1})\overline{\alpha_q(\chi_m)} \right) \end{bmatrix},$$

$$\mathcal{C} = \mathcal{B}^H = p_m \begin{bmatrix} p_1 \left( \sum_{q=1}^{N} \alpha_q(\chi_m)\overline{\alpha_q(\chi_1)} \right) \\ \vdots \\ p_{m-1} \left( \sum_{q=1}^{N} \alpha_q(\chi_m)\overline{\alpha_q(\chi_{m-1})} \right) \end{bmatrix}^H,$$

$$\mathcal{D} = \sum_{q=1}^{N} \alpha_q(\chi_m)\overline{\alpha_q(\chi_m)},$$

then as $p_m$ is a scalar value, substituting:

$$\mathcal{B} = p_m \mathcal{B}',$$

$$\mathcal{C} = p_m \mathcal{C}',$$

yields:

$$\mathcal{H} = \begin{bmatrix} \mathcal{A}^{-1} + p_m^2 \mathcal{A}^{-1}\mathcal{B}'(\mathcal{D}-p_m^2\mathcal{C}'\mathcal{A}^{-1}\mathcal{B}')^{-1}\mathcal{C}'\mathcal{A}^{-1} & -p_m\mathcal{A}^{-1}\mathcal{B}'(\mathcal{D}-p_m^2\mathcal{C}'\mathcal{A}^{-1}\mathcal{B}')^{-1} \\ -p_m(\mathcal{D}-p_m^2\mathcal{C}'\mathcal{A}^{-1}\mathcal{B}')^{-1}\mathcal{C}'\mathcal{A}^{-1} & (\mathcal{D}-p_m^2\mathcal{C}'\mathcal{A}^{-1}\mathcal{B}')^{-1} \end{bmatrix}.$$

It can be clearly seen that the behavior of this system is smooth and that:

$$\lim_{p_m \to 0} \mathcal{H} = \begin{bmatrix} H^{-1} & 0 \\ 0 & D^{-1} \end{bmatrix} = \frac{1}{\sum_{q=1}^{N} \alpha_q(\chi_m)\overline{\alpha_q(\chi_m)}},$$

and:

$$\lim_{p_m \to 1} \mathcal{H} = C^{-1}.$$

Since this is a single row and column, it can be written as:

$$\mathcal{H} = \begin{bmatrix} H^{-1} & 0 \\ 0 & 0 \end{bmatrix} + \frac{1}{\mathcal{D}-p_m^2\mathcal{C}'H^{-1}\mathcal{B}'} \begin{bmatrix} p_m^2 H^{-1}\mathcal{B}'\mathcal{C}'H^{-1} & -p_m H^{-1}\mathcal{B}' \\ -p_m\mathcal{C}'H^{-1} & 1 \end{bmatrix}.$$

Also it can be written:

$$\mathcal{H}b = z = \kappa + \frac{1}{\mathcal{D}-p_m^2\mathcal{C}'H^{-1}\mathcal{B}'}(\lambda+\mu),$$

$$b_m = p_m b_m',$$

$$\kappa = \begin{bmatrix} H^{-1} & 0 \\ 0 & 0 \end{bmatrix} \begin{bmatrix} b_{m-1} \\ 0 \end{bmatrix},$$

$$\lambda = \begin{bmatrix} H^{-1}\mathcal{B}'\mathcal{C}'H^{-1} & -H^{-1}\mathcal{B}' \\ 0 & 0 \end{bmatrix} \begin{bmatrix} b_{m-1} \\ b_m' \end{bmatrix} p_m^2,$$

$$\mu = \begin{bmatrix} 0 & 0 \\ -\mathcal{C}'H^{-1} & 1 \end{bmatrix} \begin{bmatrix} b_{m-1} \\ b_m' \end{bmatrix} p_m,$$

From here K is the pre-existing system of m−1 equations and thus pre-existing $z_{m-1}$, the impact of the merging of the independent and interdependent systems are modulated by $$\frac{1}{\mathcal{D}-p_m^2\mathcal{C}'H^{-1}\mathcal{B}'},$$

which gradually applies the addition of the extra degree of freedom. Applying a substitution to allow the last element of b to be multiplied through by $p_m$—corresponding to the incremental ramping up of the sample value $b_m$ to reach at one the intended acoustic field level $b'_m$—simplifies the system somewhat.

The left parts of the matrices in λ and μ come unchanged from the definition of the block-wise inversion. The vector μ only consists of the entire final element $z_m$, which is proportional to $p_m$. The extra change in the first m−1 elements of the z vector over and above the value produced by κ are those produced by λ and are modulated by a further $p_m$.

The only remaining problem is understanding the nature of $C\,'H^{-1}B\,'$, given that if $C\,H^{-1}\,B\,' > D$, the denominator could approach zero. The matrix H is known to be positive definite, and therefore $H^{-1}$ is also, due to having reciprocal eigenvalues. It is also a known lemma of the Schur complement $D - B^H A^{-1} B$, which states given:

$$\mathcal{H}^{-1} = \begin{bmatrix} \mathcal{A} & \mathcal{B} \\ \mathcal{B}^H & \mathcal{D} \end{bmatrix},$$

then it is known that $\mathcal{H}^{-1}$ is positive definite if and only if $\mathcal{A}$ and the Schur complement above are positive definite. Therefore, if $\mathcal{D}$ is positive definite, then $C\,'H^{-1}B\,' < \mathcal{D}$, so the process of adding a degree of freedom in this way is stable for all values of in the defined interval $p_m \in [0, 1]$.

E. Examples

Turning to FIG. 1, shown is a schematic 100 adding two new points to a single point system. In row a), shown is the original single control point system 110 with the phase and amplitude configuration of the transducer elements actuated. Next, shown is an illustration of an acoustic pressure field generated by this set of actuated transducers 112.

In row b), shown is the system with the new points added as zero amplitude points 120 with the phase and amplitude configuration of the transducer elements actuated. Next, shown is an illustration of an acoustic pressure field generated by this set of actuated transducers 122. Next, shown is the difference between the original single point solution and the new solution with two extra points added 124, which is appreciably non-zero.

In row c), shown are two points added as points with amplitudes measured from the field a) 130 with the phase and amplitude configuration of the transducer elements actuated. Next, shown is an illustration of an acoustic pressure field generated by this set of actuated transducers 132. This difference is very close to zero (around machine epsilon) for this measurement method described herein.

In row d), shown are the two points added as blended points with zero opacity or interaction 140 with the phase and amplitude configuration of the transducer elements actuated. Next, shown is an illustration of an acoustic pressure field generated by this set of actuated transducers 142. This difference is zero for the blending method described herein, where the blending coefficient for the degree of freedom associated with the new control point has been set to zero.

Figure 2:
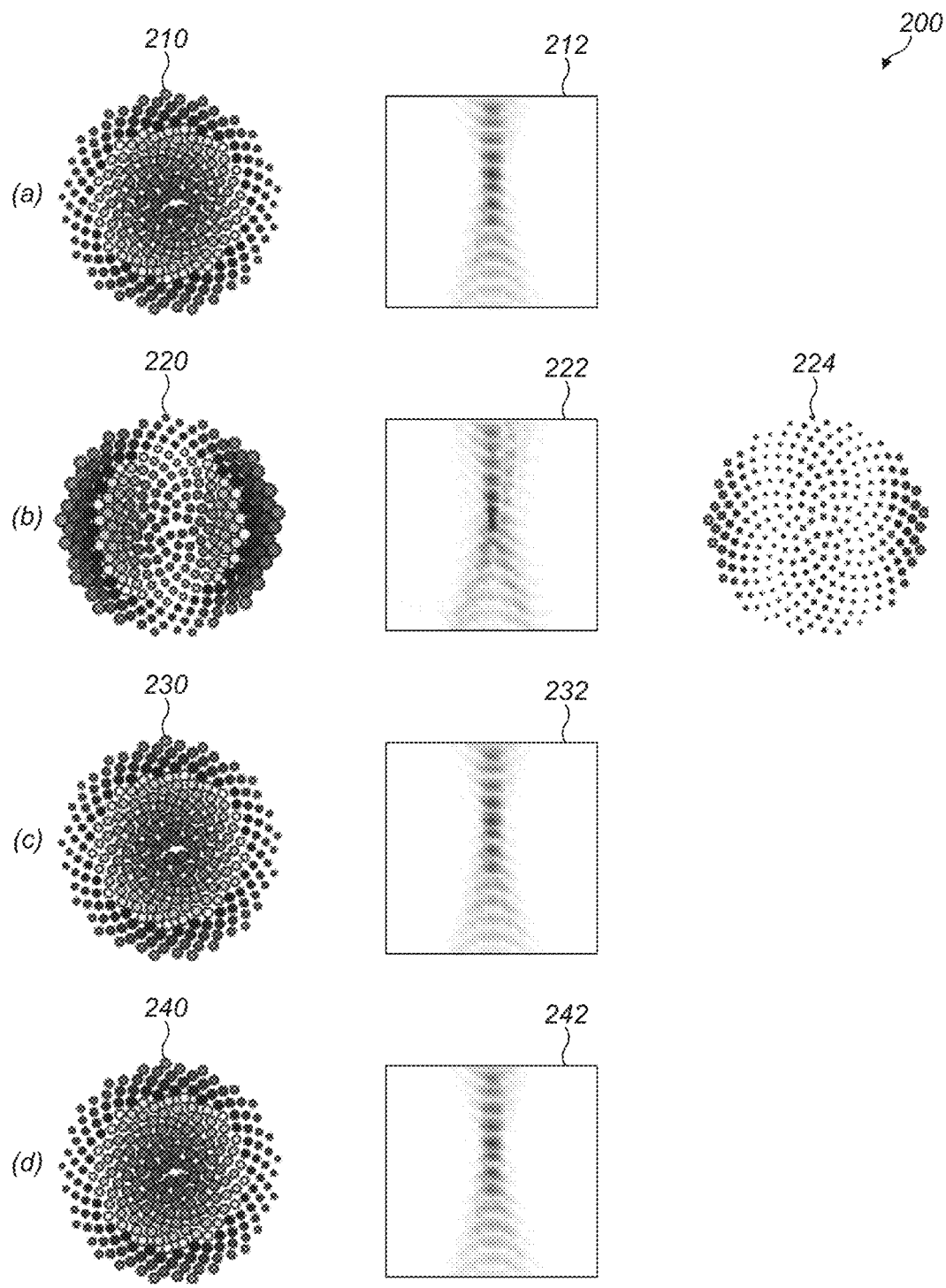
FIG. 2 shows a schematic of adding one new control points to a dual control point system.

Turning to FIG. 2, shown is a schematic 200 adding one new point to a system with two existing control points. In row a), shown is the original two control point system 210 with the phase and amplitude configuration of the transducer elements actuated. Next, shown is an illustration of an acoustic pressure field generated by this set of actuated transducers 212.

In row b), shown is the system with the new point added as zero amplitude points 220 with the phase and amplitude configuration of the transducer elements actuated. Next, shown is an illustration of an acoustic pressure field generated by this set of actuated transducers 222. Next, shown is the difference between the original two control point solution and the new solution with the extra point added 224, which is appreciably non-zero.

In row c), shown is the point added as a point with amplitude measured from the field a) 230 with the phase and amplitude configuration of the transducer elements actuated. Next, shown is an illustration of an acoustic pressure field generated by this set of actuated transducers 232. This difference is very close to zero (around machine epsilon) for this measurement method described herein.

In row d), shown is the point added as a blended point with zero opacity or interaction 240 with the phase and amplitude configuration of the transducer elements actuated. Next, shown is an illustration of an acoustic pressure field generated by this set of actuated transducers 242. This difference is zero for the blending method described herein, where the blending coefficient for the degree of freedom associated with the new control point has been set to zero.

Figure 3:
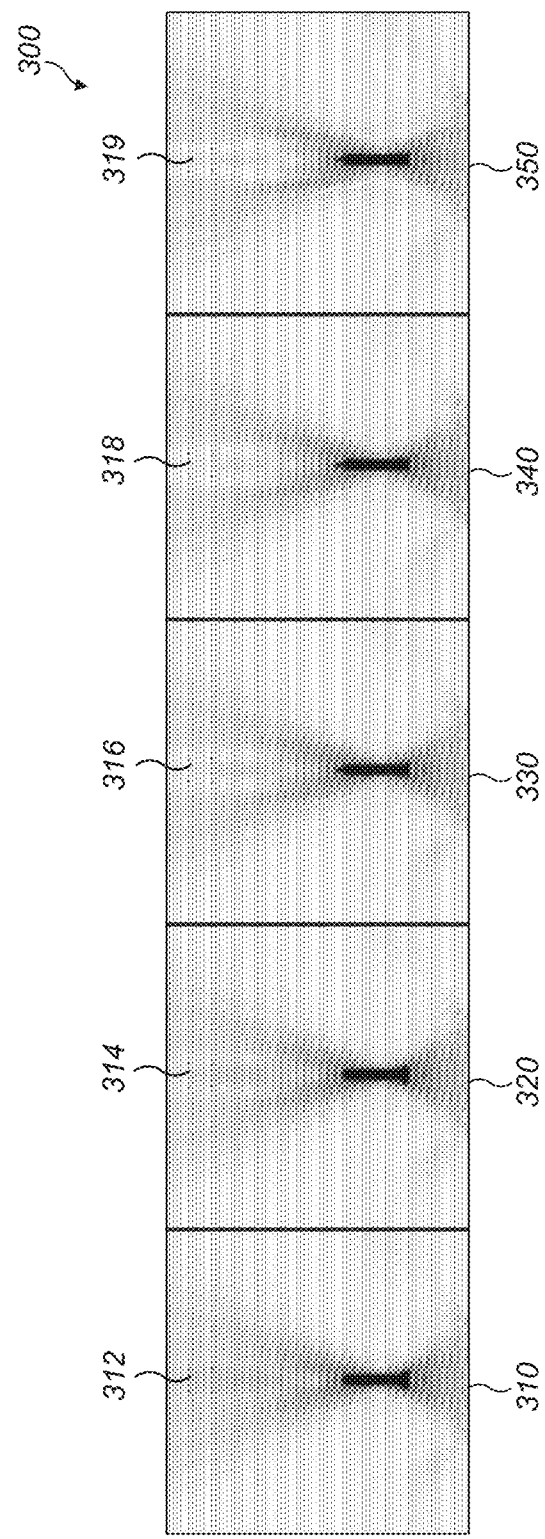
FIG. 3 shows a schematic of a blending of a set of four null points into a single-control point acoustic field.

Turning to FIG. 3, shown is a series 300 of the blending of a set of four null points (points of zero amplitude, marked by dots at the top of the figure) into the acoustic field generated initially by a powerful control point (black shaded region). The five figures are from left to right, 0% 310, 25% 320, 50% 330, 75% 340, and 100% 350 opacity coefficient (the square of $p_j$) with respective sets of 4 null points 312, 314, 316, 318, 319. The main control point is modified in pressure by 0.00 dB, −0.06 dB, −0.14 dB, −0.21 dB and −0.23 dB respectively. As the number of null points needed increases, the effect on the generated foci will increase, making the tuning of quiet zones important to balance power against quiet zone effectiveness.

II. Transducer O(1) Solver

A. Introduction

As the number of transducers increases, so too does the number of entries in the matrix A. This also increases the number of function evaluations, multiplies and sums required to produce each entry of the matrix $AA^H$. However, as the locations of each transducing element become so close as to be difficult to distinguish from each other even in the near field of the array (once the transducer has greater than critical packing density where packing $\geq \lambda/2$, or otherwise where the packing density is sufficient that the error in a continuous approximation becomes tolerable) then the summarization of the contributions may be considered as a continuum. This means that instead of considering the contributions of each transducer, the array may be considered as an idealized object where the contribution to the field is continuous across its surface. Therefore, the matrix multiplication $AA^H$ which may be expanded as:

$$C = AA^H = \begin{bmatrix} \sum_{q=1}^{N} \alpha_q(\mathcal{X}_1)\overline{\alpha_q(\mathcal{X}_1)} & \cdots & \sum_{q=1}^{N} \alpha_q(\mathcal{X}_1)\overline{\alpha_q(\mathcal{X}_m)} \\ \vdots & \ddots & \vdots \\ \sum_{q=1}^{N} \alpha_q(\mathcal{X}_m)\overline{\alpha_q(\mathcal{X}_1)} & \cdots & \sum_{q=1}^{N} \alpha_q(\mathcal{X}_m)\overline{\alpha_q(\mathcal{X}_m)} \end{bmatrix},$$

may now for an exemplar rectilinear array whose component transducers are considered to be a continuous planar surface may be written:

$$C = AA^H = \begin{bmatrix} \int\int_{-\eta_x,-\eta_y}^{\eta_x,\eta_y} \alpha(\pmb{\mathcal{X}}_1)\overline{\alpha_q(\pmb{\mathcal{X}}_1)}dydx & \cdots & \int\int_{-\eta_x,-\eta_y}^{\eta_x,\eta_y} \alpha(\pmb{\mathcal{X}}_1)\overline{\alpha_q(\pmb{\mathcal{X}}_m)}dydx \\ \vdots & \ddots & \vdots \\ \int\int_{-\eta_x,-\eta_y}^{\eta_x,\eta_y} \alpha(\pmb{\mathcal{X}}_m)\overline{\alpha_q(\pmb{\mathcal{X}}_1)}dydx & \cdots & \int\int_{-\eta_x,-\eta_y}^{\eta_x,\eta_y} \alpha(\pmb{\mathcal{X}}_m)\overline{\alpha_q(\pmb{\mathcal{X}}_m)}dydx \end{bmatrix},$$

without loss of generality, as the same principle may be applied to any contiguous array surface or series of contiguous array surfaces, which are not required to be planar.

Due to this continuous focusing surface, the independent degrees of freedom required to uniquely define the behavior, and thus the entropy of the function that describes the radiation emitted from the focusing surface drops sharply. It should therefore be possible to find a method to compute this quantity with less effort than is required to compute the individual multiplications and addition required to compute the sum that is generally used to obtain this function.

A common definition of $\alpha(\pmb{\mathcal{X}})$ which generates complex monochromatic acoustic pressure is:

$$\alpha(\pmb{\mathcal{X}}) = k\delta_a\left(\frac{\pmb{\mathcal{X}}\cdot\hat{n}}{|\pmb{\mathcal{X}}|}\right)\frac{\exp(2\pi(i-a)|\pmb{\mathcal{X}}|)}{|\pmb{\mathcal{X}}|},$$

assuming the length of the vector denoted by $|\pmb{\mathcal{X}}|$ may be measured in wavelengths, a is the attenuation over distance in air, $\delta_a$ a function denoting the directivity of the element and k a calibration constant. While it is clear that it can be written for a general rectilinear array as a $\mathbb{R}^B \to \mathbb{C}$ function:

$$\mathcal{F}(\eta_x,\eta_y,\pmb{\mathcal{X}}_{xa},\pmb{\mathcal{X}}_{ya},\pmb{\mathcal{X}}_{za},\pmb{\mathcal{X}}_{xb},\pmb{\mathcal{X}}_{yb},\pmb{\mathcal{X}}_{zb}) = \int_{-\eta_x,\eta_y}^{\eta_x,} {}^{\eta_y}\alpha(\pmb{\mathcal{X}}_a)\overline{\alpha(\pmb{\mathcal{X}}_b)}\,dydx,$$

finding a symbolic expression to use to evaluate the function is difficult. If the system is reduced to only one particular 'tile' type of any (even non-contiguous) shape, it can be written as a $\mathbb{R}^6 \to \mathbb{C}$ function:

$$\mathcal{F}(\pmb{\mathcal{X}}_{xa},\pmb{\mathcal{X}}_{ya},\pmb{\mathcal{X}}_{za},\pmb{\mathcal{X}}_{xb},\pmb{\mathcal{X}}_{yb},\pmb{\mathcal{X}}_{zb}) = \int_{\Omega}\alpha(\pmb{\mathcal{X}}_a)\overline{\alpha(\pmb{\mathcal{X}}_b)}\,d\Omega,$$

which may have an associated C matrix:

$$C = AA^H = \begin{bmatrix} \int\int_{\Omega}\alpha(\pmb{\mathcal{X}}_1)\overline{\alpha(\pmb{\mathcal{X}}_1)}d\Omega & \cdots & \int\int_{\Omega}\alpha(\pmb{\mathcal{X}}_1)\overline{\alpha(\pmb{\mathcal{X}}_m)}d\Omega \\ \vdots & \ddots & \vdots \\ \int\int_{\Omega}\alpha(\pmb{\mathcal{X}}_m)\overline{\alpha(\pmb{\mathcal{X}}_1)}d\Omega & \cdots & \int\int_{\Omega}\alpha(\pmb{\mathcal{X}}_m)\overline{\alpha(\pmb{\mathcal{X}}_m)}d\Omega \end{bmatrix}.$$

While this function may be understood as a description of the acoustic pressure of all single-focused acoustic fields generated by the phased array tile with focus position $\pmb{\mathcal{X}}_b = \{\pmb{\mathcal{X}}_{xb}, \pmb{\mathcal{X}}_{yb}, \pmb{\mathcal{X}}_{zb}\}$ and sampling location $\pmb{\mathcal{X}}_a = \{\pmb{\mathcal{X}}_{xa}, \pmb{\mathcal{X}}_{ya}, \pmb{\mathcal{X}}_{za}\}$, symbolic integration for non-trivial phased array tiles remains impractical despite the evaluated complex-valued fields being of low entropy.

Further, while this is presented here as a method to generate specifically focused fields by multiplying the infinitesimal transducer functions with the drive function to focus at each location as $\alpha(\pmb{\mathcal{X}}_2)$, this could be simply modified to generate specific known acoustic fields by parameterizing the drive function differently to generate a formulation for, for instance, generation of Bessel beams from the continuous surface instead. In this case, a linear system of control points may still be used to control the acoustic field, although these control points may no longer correspond to foci.

Figure 4:
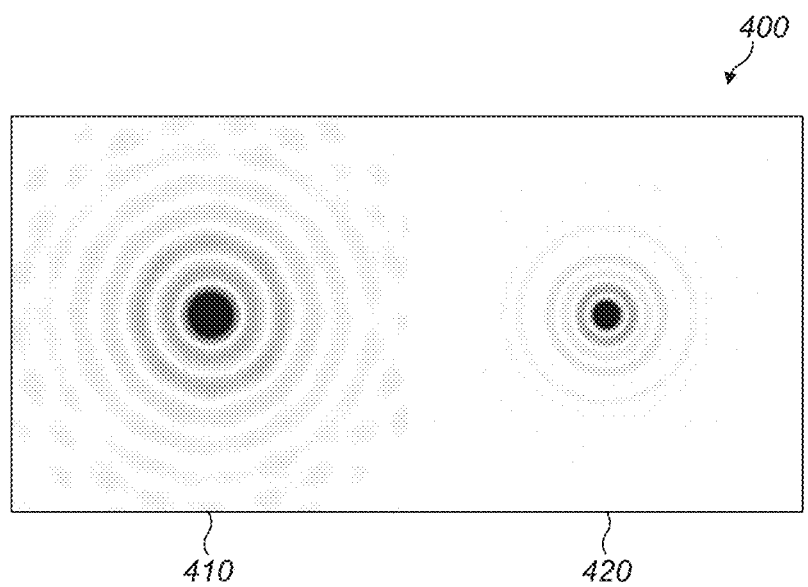
FIG. 4 shows a focal spot of a simulated acoustic field parallel to a wave front.

Turning to FIG. 4, shown is an illustration 400 with two sections through the focal spot of a simulated acoustic field parallel to the wave front, one produced by a 256-element phased array 410 and one produced by a 1024-element array 420. These are the same emitting elements but packed more tightly. A threshold has been applied to the field (black) at the same acoustic pressure level—despite yielding a stronger focus the section on the right is smaller (owing to being more tightly focused), with greatly reduced ringing artefacts. Loss of control of the field outside the focus is inevitable but can be attenuated with sufficient element count.

Figure 5:
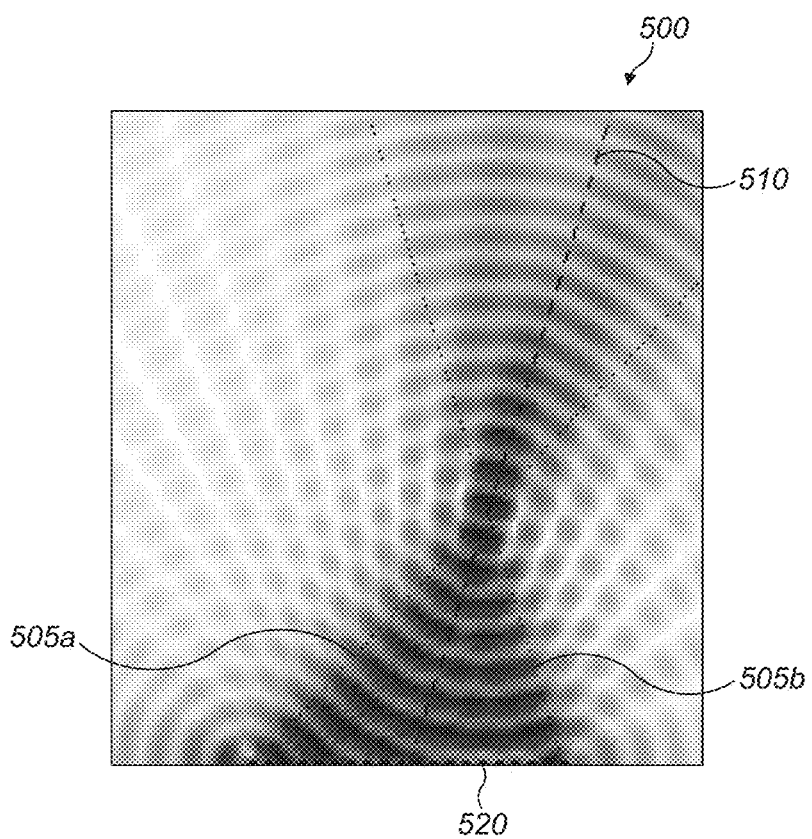
FIG. 5 shows a phased-array system undergoing focusing.

Turning to FIG. 5, shown is a phased array system 500 (emitting elements are shown as black circles 520) undergoing focusing, showing behavior that is analogous to an optical lens. The dashed line 510 is the optical axis, while the extent of the converging 'rays' is demarcated by the dotted lines 505a, 505b. A plane of reflection normal to the dotted line at the focus then would reflect the upper part of the system (beyond the dot) back upon the phased array. As this plane of reflection may ostensibly model the interaction of a human hand with a mid-air haptic phased array system, then the second reflection of the wave field from the plane of the phased array is the primary method for the focused beam to add to the unwanted portion of the field.

B. Neural Networks

Some types of neural networks have been previously used to fit functions implicitly described as solutions to differential equations. As the functions required here are sums and products of exponential functions, choosing a neural network architecture type comprised of sine waves (here SIREN from Sitzmann et al.—Implicit Neural Representations with Periodic Activation Functions) to illustrate the concept seems a natural illustrative choice, although the bulk neural network architecture may be implemented using any number of standard architectures.

When training a small neural network to perform this integral it is important to consider the structure of the integral. For instance, setting the wavelength and frequency to unity or finding an appropriate scaling factor with a view to working with a particular set of initialization weights help to speed convergence of the training procedure. The training may be conducted using the sum of the transducer model multiplications as described in the entries of the C matrices, which as spacing reduces $<\lambda/2$ behaves increasingly less like individual elements, although this integration method is not limited to use cases where this condition is true. The definition used for the attenuation of the acoustic wave in air represents a loss of Approximately 0.0113 dB per wavelength travelled, although other more specialized attenuation functions that are not constant with respect to the wavelength or frequency may be used. Since the requirements in the exemplar described are all defined in terms the wavelength and frequency, this is a free parameter to be chosen to help the numerical procedure, regardless of the physical wavelength or frequency of the system.

While the integral under consideration in this example procedure has six dimensions and is densely populated, it represents two sets of three-dimensional coordinates. As such, it is prudent to use the fact that the integral represents a wavefield to add extra constraining terms to the loss function.

C. Eikonal Property

For instance, while the individual transducers functions $\alpha(\mathcal{X}) = p_q(\mathcal{X})$ that model pressure satisfy the Eikonal equation:

$$|\nabla p_q(\mathcal{X})| = \omega(i-\alpha) = 2\pi f(i-a),$$

because they are models of far field behavior, this is also why:

$$u_{x,q}(\mathcal{X}) = -ikp_q(\mathcal{X})\hat{n}_x,$$

$$u_{y,q}(\mathcal{X}) = -ikp_q(\mathcal{X})\hat{n}_y,$$

$$u_{z,q}(\mathcal{X}) = -ikp_q(\mathcal{X})\hat{n}_z,$$

where $k = 1/\rho_0 \omega$ is a constant and attenuation affects both quantities. However, when the transducer fields are summed together or integrated over, the combined field created from the combined models does not satisfy this Eikonal condition.

D. Non-Smooth Neural Networks

A neural network is often comprised of linear units, which are piecewise linear but non-linear functions that permit machine learning when taken as an ensemble. As networks comprised of these are not smooth and therefore would not as readily fit the sines and cosines of the pressure function, it is useful to abstract the function to reduce the fitting complexity from the point-of-view of these neural networks.

The complex valued output of the integral may be represented instead as:

$$\alpha_\Omega; \mathcal{X}_b(\mathcal{X}_a) = \mathcal{F}(\mathcal{X}_{xa}, \mathcal{X}_{ya}, \mathcal{X}_{za}, \mathcal{X}_{xb}, \mathcal{X}_{yb}, \mathcal{X}_{zb})$$
$$= A e^{i\phi} = a + ib,$$

where the integration outputs A and $\phi$ are the outputs from the neural network instead of a and b which would have heavily sinusoidal properties. However, using gradient backpropagation through the final a+ib to learn the outputs A and $\phi$ are problematic. This is because of the branch cut—as many values of $\phi$ each a $2\pi$ multiple apart may be used to fit the integral output the machine may fit the same angle value to different parts of the field resulting in almost discontinuous wrinkles in the field caused by an almost instantaneous jump from $2\pi(n-m)$ to $2\pi n$ for some integers n and m, shown in FIG. 6. These are particularly problematic in the use case of generating acoustic fields for ultrasonic applications in air as these function discontinuities may cause audible noise through non-linear acoustic effects.

Therefore, a method of phase unwrapping the interference pattern generated by the integral is necessary to alleviate this problem by enabling the network to train directly on the unwrapped phase. This is achieved by creating a first approximate phase unwrapping term $\phi_1$ which contains multiple rotations $2\pi n$ for some integer n and is accurate to within $\pm w$. A second term may then be determined as a final phase correction term produced by:

$$\phi_2(\mathcal{X}_{xa}, \mathcal{X}_{ya}, \mathcal{X}_{za}, \mathcal{X}_{xb}, \mathcal{X}_{yb}, \mathcal{X}_{zb}) =$$

$$\arg \frac{\mathcal{F}(\mathcal{X}_{xa}, \mathcal{X}_{ya}, \mathcal{X}_{za}, \mathcal{X}_{xb}, \mathcal{X}_{yb}, \mathcal{X}_{zb})}{\exp(i\phi_1)}.$$

Such that $\phi_p = \phi_1 + \phi_2$.

The function for $\phi_1$ is then described by:

$$\phi_1(\ldots) = \frac{2\pi}{\lambda} \begin{cases} \max_{q \in \{1,\ldots,N\}} |\mathcal{X}_a - \mathcal{X}_q| - |\mathcal{X}_a - \mathcal{X}_b|, & \text{where } \Re(p(\mathcal{X}_a)\overline{u(\mathcal{X}_a)}) \cdot \\ & (\mathcal{X}_a - \mathcal{X}_b) \leq 0 \\ \max_{q \in \{1,\ldots,N\}} |\mathcal{X}_a - \mathcal{X}_q| - |\mathcal{X}_a - \mathcal{X}_b|, & \text{where } \Re(p(\mathcal{X}_a)\overline{u(\mathcal{X}_a)}) \cdot \\ & (\mathcal{X}_a - \mathcal{X}_b) \geq 0 \end{cases},$$

where $\Re(p(\mathcal{X}_a)\sqrt{\overline{u(\mathcal{X}_a)}})$ is a Poynting vector, so this describes a maximum distance when the energy flows towards the focus and a minimum distance when the energy flows away. As each transducer satisfies the Eikonal equation, the maximum or minimum distance also satisfies this, thus each isosurface in the phase function is given an approximately unique value determining the time-of-flight to or from the focus. As this function may be discontinuous in regions where $\Re(p(\mathcal{X}_a)\underline{u}(\mathcal{X}_a)) \cdot (\mathcal{X}_a - \mathcal{X}_b) = 0$ indicating no net energy flow, this is an unsuitable formulation for neural networks where smoothness is required. However, as discontinuities are restricted to regions where the energy flow is net zero and therefore low acoustic pressure, this is unlikely to cause any audible problems when used to describe the acoustic field. As the focus is always represented as the zero value in each case, it is clear that across all six dimensions the function is smooth with the exception of the discontinuous net zero energy flow condition that can be viewed as extending consistently across all dimensions. This formulation is especially useful as the optional evaluation of $\phi$ at the transducer surface yields may be further used to yield time of flight information, as $\phi$ measures distance from the focus.

If integrals are created to train the network to express other acoustic quantities besides pressure (such the particle velocities of the medium), further complex argument angle modification may be used to generate this as:

$$\phi_2(\mathcal{X}_{xa}, \mathcal{X}_{ya}, \mathcal{X}_{za}, \mathcal{X}_{xb}, \mathcal{X}_{yb}, \mathcal{X}_{zb}) =$$
$$\arg \frac{p(\mathcal{X}_{xa}, \mathcal{X}_{ya}, \mathcal{X}_{za}, \mathcal{X}_{xb}, \mathcal{X}_{yb}, \mathcal{X}_{zb})}{\exp(i\phi_1)},$$

$$\phi_{3,x}(\mathcal{X}_{xa}, \mathcal{X}_{ya}, \mathcal{X}_{za}, \mathcal{X}_{xa}, \mathcal{X}_{ya}, \mathcal{X}_{za}) =$$
$$\arg \frac{u_x(\mathcal{X}_{xa}, \mathcal{X}_{ya}, \mathcal{X}_{za}, \mathcal{X}_{xb}, \mathcal{X}_{yb}, \mathcal{X}_{zb})}{\exp(i(\phi_1 + \phi_2))},$$

$$\phi_{3,y}(\mathcal{X}_{xa}, \mathcal{X}_{ya}, \mathcal{X}_{za}, \mathcal{X}_{xb}, \mathcal{X}_{yb}, \mathcal{X}_{zb}) =$$
$$\arg \frac{u_y(\mathcal{X}_{xa}, \mathcal{X}_{ya}, \mathcal{X}_{za}, \mathcal{X}_{xb}, \mathcal{X}_{yb}, \mathcal{X}_{zb})}{\exp(i(\phi_1 + \phi_2))},$$

$$\phi_{3,z}(\mathcal{X}_{xa}, \mathcal{X}_{ya}, \mathcal{X}_{za}, \mathcal{X}_{xb}, \mathcal{X}_{yb}, \mathcal{X}_{zb}) =$$
$$\arg \frac{u_z(\mathcal{X}_{xa}, \mathcal{X}_{ya}, \mathcal{X}_{za}, \mathcal{X}_{xb}, \mathcal{X}_{yb}, \mathcal{X}_{zb})}{\exp(i(\phi_1 + \phi_2))},$$

where: $= p(\ldots) = A e^{i\phi_p} = A e^{i(\phi_1 + \phi_2)}$, $u_x(\ldots) = B_x e^{i\phi_{u_x}} = B_x e^{i(\phi_1 + \phi_2 + \phi_{3,x})}$, $u_y(\ldots) = B_y e^{i\phi_{u_y}} = B_y e^{i(\phi_1 + \phi_2 + \phi_{3,y})}$, $u_z(\ldots) = B_z e^{i\phi_{u_z}} = B_z e^{i(\phi_1 + \phi_2 + \phi_{3,z})}$, so A, $B_x$, $B_y$, $B_z$, $\phi_p$, $\phi_{u_x}$, $\phi_{u_y}$, $\phi_{u_z}$ may be learned parameters depending on which linear acoustic quantities may be necessary from the field.

Figure 6:
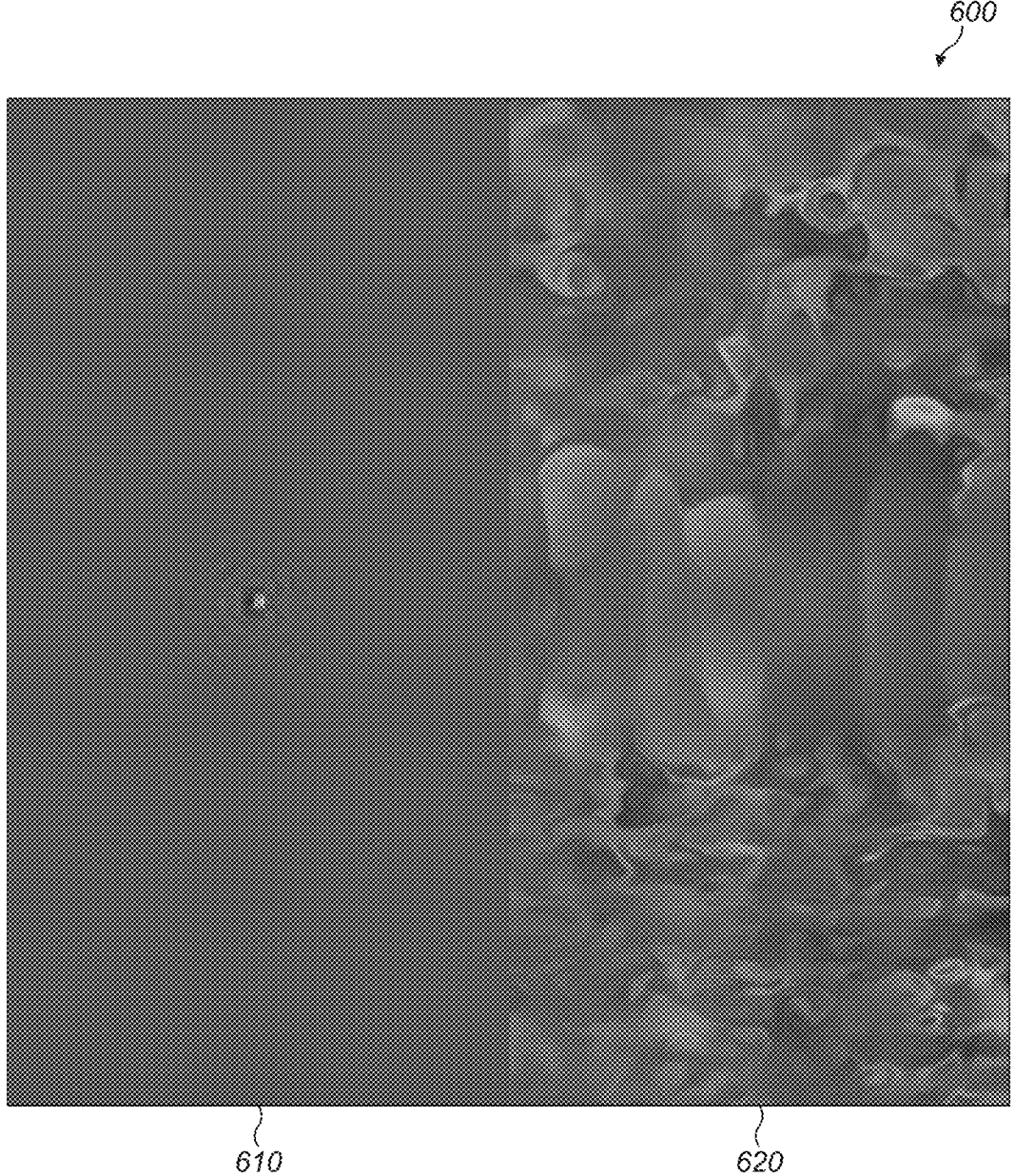
FIG. 6 shows partial convergences of a function $Ae^{i\Phi}$.

Turning to FIG. 6, shown is an illustration of $\mathcal{F}$ ($\mathcal{X}_{xa}$, $\mathcal{X}_{ya}$, $\mathcal{X}_{za}$, $\mathcal{X}_{xb}$, $\mathcal{X}_{yb}$, $\mathcal{X}_{zb}) = A e^{i\phi} = a + ib$, viewing partial convergence of a subspace of the six-dimensional machine-learned function with output parameters A (amplitude) and $\phi$ (phase) that may be used to measure for instance acoustic pressure, where the subspace viewed is at $\mathcal{X}_{xb}=0$, $\mathcal{X}_{yb}=0$, $\mathcal{X}_{zb}=16$, $\mathcal{X}_{xa}=[-32,32]$, $\mathcal{X}_{ya}=0$, $\mathcal{X}_{za}=[0,32]$. The real part of $Ae^{i\phi}$=a+ib, 'a' is shown on the left 610 and the phase of $Ae^{i\phi}$ '$\phi$' is shown on the right 620. Notice the subtle artifact locations in the real part on the left side 610 coincide with the phase angle jumps in the right hand side 620, as the network is in this case problematically learning phase angle as a discontinuous function.

E. Smooth Neural Networks

When the neural networks are composed of smooth functions (such as SIREN), this lends itself to using the differentiable structure of the network itself to generate further constraints on the training function, which is also smooth. As these are comprised of sines (and cosines are merely phase-shifted sine functions) the real and imaginary parts of the complex pressure may be used for training directly.

The real and imaginary parts of the combined field does then satisfy the Helmholtz equation, which may be described as:

$$(\nabla^2+\omega^2)=0,$$

but the three-dimensional space where the equation holds is both $\mathcal{X}_a$ and $\mathcal{X}_b$ since the focus is a pseudo-source so due to the principle of acoustic reciprocity moving either the sample position with $\mathcal{X}_a$ or the focus location with $\mathcal{X}_b$ both yield separate Helmholtz equation conditions as:

$$\frac{\partial^2 \alpha}{\partial \mathcal{X}_{xa}^2} + \frac{\partial^2 \alpha}{\partial \mathcal{X}_{ya}^2} + \frac{\partial^2 \alpha}{\partial \mathcal{X}_{za}^2} = -\omega^2\alpha,$$

$$\frac{\partial^2 \alpha}{\partial \mathcal{X}_{xb}^2} + \frac{\partial^2 \alpha}{\partial \mathcal{X}_{yb}^2} + \frac{\partial^2 \alpha}{\partial \mathcal{X}_{zb}^2} = -\omega^2\alpha,$$

for both real and imaginary parts. This may be then used as a constraint by using these in the backpropagation. A possible way to leverage this condition as a loss term to be minimized may be written:

$$\mathcal{L} := \mathcal{L} + \left(\frac{1}{\omega^2}\left(\frac{\partial^2 \alpha'}{\partial \mathcal{X}_{xa}^2} + \frac{\partial^2 \alpha'}{\partial \mathcal{X}_{ya}^2} + \frac{\partial^2 \alpha'}{\partial \mathcal{X}_{za}^2}\right) + \alpha\right)^2$$

$$\mathcal{L} := \mathcal{L} + \left(\frac{1}{\omega^2}\left(\frac{\partial^2 \alpha'}{\partial \mathcal{X}_{xb}^2} + \frac{\partial^2 \alpha'}{\partial \mathcal{X}_{yb}^2} + \frac{\partial^2 \alpha'}{\partial \mathcal{X}_{zb}^2}\right) + \alpha\right)^2$$

where $\alpha'$ is the real or imaginary part output from the network and $\alpha$ the corresponding real or imaginary part of the data point of the ground truth data for this function $\mathcal{F}(\mathcal{X}_{xa}, \mathcal{X}_{ya}, \mathcal{X}_{za}, \mathcal{X}_{xb}, \mathcal{X}_{yb}, \mathcal{X}_{zb})$.

As the Fourier transforms of the solutions would have significant energy in the frequency of the carrier wave used (which for simplicity has been set to unity), the multiplication in the Fourier expansion of the differential operators corresponding to that frequency will also be the dominant coefficient factor in any field gradients. As a result, the optimal coefficients to use when computing additions to the loss function based on gradient constraints may be simply calculated as powers of a, so where the function is $\alpha$, first derivatives will be $|\partial \alpha| \approx |\omega \alpha|$, second derivatives will be $|\partial^2 \alpha| \approx |\omega^2 \alpha|$, etc, providing a simple way to normalize the contribution of gradients to the loss function $\mathcal{L}$.

These gradients may be generated from the training data by either explicitly calculating symbolic derivatives of the modelled field, or by evaluating the modelled field and using finite differencing. Evaluating the derivative of each transducer contribution modelling function in the summation may be computed symbolically. When these symbolic derivatives are evaluated, these can be summed to produce the derivatives of the full field that are required, as derivatives are linear operators. Finite differencing is simple to use and due to the wavelength of the phased array system being consistent the kernel width may be fixed to be an appropriately small (h>>½λ) fraction of a wavelength.

The loss function may then be written as some combination of:

$$\mathcal{L}_0 := (\alpha' - \alpha)^2,$$

$$\mathcal{L}_1 := \sum_{i \in \{\mathcal{X}_{xa}, \mathcal{X}_{ya}, \mathcal{X}_{za}, \mathcal{X}_{xb}, \mathcal{X}_{yb}, \mathcal{X}_{zb}\}} \left(\frac{1}{\omega}\left(\frac{\partial \alpha'}{\partial i} - \frac{\partial \alpha}{\partial i}\right)\right)^2,$$

$$\mathcal{L}_2 := \sum_{i \in \{\mathcal{X}_{xa}, \mathcal{X}_{ya}, \mathcal{X}_{za}, \atop \mathcal{X}_{xb}, \mathcal{X}_{yb}, \mathcal{X}_{zb}\}} \sum_{j \in \{\mathcal{X}_{xa}, \mathcal{X}_{ya}, \mathcal{X}_{za}, \atop \mathcal{X}_{xb}, \mathcal{X}_{yb}, \mathcal{X}_{zb}\}} \left(\frac{1}{\omega^2}\left(\frac{\partial^2 \alpha'}{\partial i \partial j} - \frac{\partial^2 \alpha}{\partial i \partial j}\right)\right)^2,$$

$$\mathcal{L} := \mathcal{L}_0 + \mathcal{L}_1 + \mathcal{L}_2 + \ldots$$

where the loss function then has its derivatives with respect to each parameter—the weights and biases—evaluated in the usual way so as to update the optimization direction to incrementally train the neural network parameters such that the network converges to the function $\mathcal{F}$.

F. Training Regimen

Sampling is of particular importance given the smoothness of the functions that make up the acoustic field model integrals. It is also true that sufficiently high frequency noise can be made to fit any function, so careful sampling or constraints based on gradients are necessary to avoid a degeneration into well-fitted noise.

Instead of using random samples, the network appears to converge much more readily when the integral is sampled using randomly chosen rows. Generating a randomly placed row of training data along one of the six dimensions chosen at random appears to enable convergence. Obtaining convergence on the subspace occupied by the focus points seems to 'anchor' the system sufficiently to allow the remainder to be incrementally trained without upset.

Another method to sample the integral is to select an incremental subsequence randomly chosen from a Hilbert curve which meanders through the n-dimensional space of inputs (for the function $\mathcal{F}(\mathcal{X}_{xa}, \mathcal{X}_{ya}, \mathcal{X}_{za}, \mathcal{X}_{xb}, \mathcal{X}_{yb}, \mathcal{X}_{zb})$, this would be 6-dimensional). The dimensions may be permuted randomly so that the edge directions are distributed more isotropically—Hilbert curves in high dimensions exhibit significant anisotropy that could otherwise bias sampling. Then, using the Hilbert curve vertices to sample to underlying function $\mathcal{F}$, a random patch of samples is created with the structure of a uniform grid for the extent of the patch. The patch is then overlaid onto the uniform n-dimensional grid which comprises the input space. This then has the same effect as sampling a random row, but along multiple dimensions at once and in a spatially localized region. Skilling's algorithm (Programming the Hilbert curve, Skilling, J., 2004) is used to produce the Hilbert curve subsequence. It should be noted the length of the full sequence of the Hilbert curve may be smaller than the full grid size of the input space, but to provide acceptable randomness the subsequence length should be significantly shorted than the total length of the full sequence of the Hilbert curve.

Sampling the three-dimensional subspace that comprises the foci of the field space converges quickly (as it contains a great deal of energy in a small subspace of the field), and then growing the regions in which complex exponentials converge in a growing radius from the focal regions appears to be fastest method to achieve convergence for the field.

Applying a constant gain to the learned pressure values may be necessary to allow gradients to percolate effectively in SIREN neural networks with many (>4) dense layers.

G. Variations on the Network

It may also be reasonable to train the networks to produce the velocity dot product with a known direction vector. This would allow the production of a known force along the given direction vector at the cost of increasing the number of input features of the network, as the normal vector direction of the force would have to be given as an input. This may be encoded as a two-dimensional spherical coordinate, which could help to reduce the extra degrees of freedom required to hold this information in the network, as well as reduce the number of inputs required.

The network may also be constrained to only be trained for regions wherein creating control points is desirable, leading to some reduction in training time or necessary network capability. As the network may be trained close to the transducers, it may also encode transducer drives which allow the matrix A to also be computed. The neighborhood of the transducer array contains the nascent acoustic field as it leaves the transducers, so sampling this near limit of the field can imply a particular complex drive coefficient for each of the transducers required to generate a focus, yielding a way to find the transducer coefficients to reproduce the acoustic field by evaluating the whole field model, instead of the individual transducer models. If the specialization for individual transducer modelling is costly, this could allow a single array model (which may be comprised of multiple neural networks) to provide all of the acoustic modelling in a single unit.

Using a positional encoding to artificially pre-project the low dimensional input onto a high dimensional space which is more appropriate in value for neural network learning may also be used to speed convergence. This may be achieved by creating a static transformation layer with the functions:

$$f_{layer}(\mathcal{X}) = \begin{bmatrix} \cos 2^{-N} \pi \mathcal{X} \\ \sin 2^{-N} \pi \mathcal{X} \\ \vdots \\ \cos 2^2 \pi \mathcal{X} \\ \sin 2^2 \pi \mathcal{X} \end{bmatrix},$$

for each input dimension X (in the exemplar field, this would be $\mathcal{F}(\mathcal{X}_{xa}, \mathcal{X}_{ya}, \mathcal{X}_{za}, \mathcal{X}_{xb}, \mathcal{X}_{yb}, \mathcal{X}_{zb})$, so again 6 such vectors would be concatenated to make up this pre-processing transformation layer). It should be noted that the range [−N, 2] enables the encoding of detail down to quarter wavelength precision, in the case that λ=1. While this may be excessive, it is sure to capture all of the detail, and −N should be set equivalently to permit as large an acoustic field region as desired.

III. Volumetric Mid-Air Haptic Rendering Method for Interacting with Dynamic 3D Objects

A. Part I

In the following paragraphs, haptic object refers to the object as to which the haptics are calculated from, while recipient object refers to the target of the produced haptics. The developer refers to the person implementing the solution, while the user refers to the person interacting with the environment in which the solution has been implemented. Focal points refers to the mid-air haptic focal point created by the mid-air haptic array, a 3D point in space which the power of the array is focused to.

Reproducing the effect requires a three stage approach: firstly, the objects must be computed to understand the effective regions into which they can intersected with, secondly calculating the intersection of regions between the "haptic" objects and the "recipient" objects, and finally populating the currently intersecting regions with 3D positions to translate the mid-air haptic focal point between.

Figure 7:
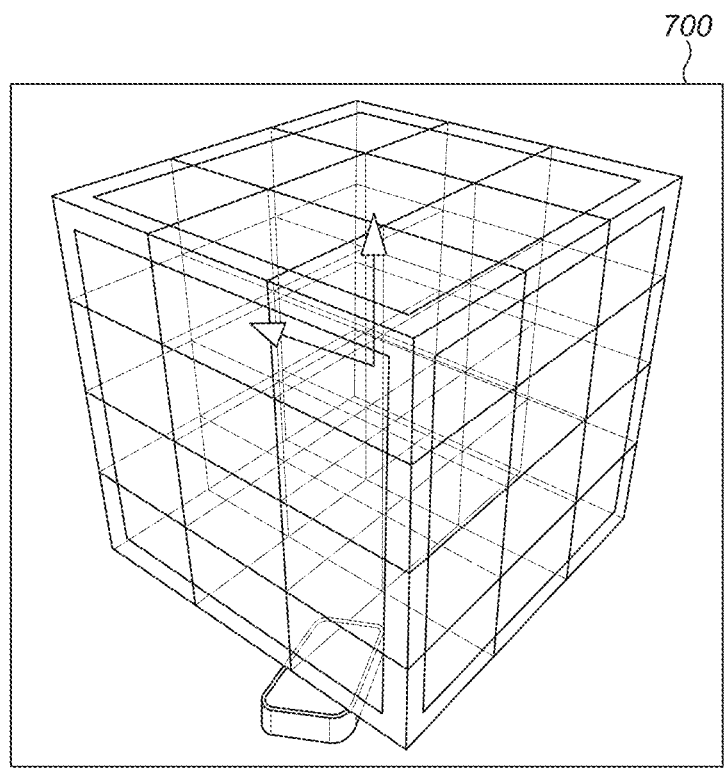
FIG. 7 shows an object with a 3-axis vector subdivision.

The first stage is done by subdividing the overall bounding box of the haptic object's mesh, by a developer defined 3 axis vector or through dynamic size based calculations. Shown in FIG. 7 is a first-stage schematic 700 of an object with a 3-axis vector subdivision of 3×4×3.

These subdivisions are expected to produce regions the size of the haptic feedback resolution, combined with expected margin of error differences in the tracking solution. Intersection tests are performed between the created regions and the mesh to ensure that it is part of the object, and not simply part of the bounding box. By doing this we can be sure that objects with varying structure do not create extra unnecessary regions that would cause false positives for haptic calculations. These generated regions are parented to the haptic object and dynamically adjust their position, rotation, and size based upon relative changes to the haptic object. This information is calculated pre-interaction, generally speaking "offline" before being used within the simulation and stored into the haptic objects metadata. The developer define 3 axis vector controls the amount of computation required for the calculation and can exponentially increase, thus meaning a low complexity object can be recalculated at run time, while a high complexity object would be undesired.

Figure 8:
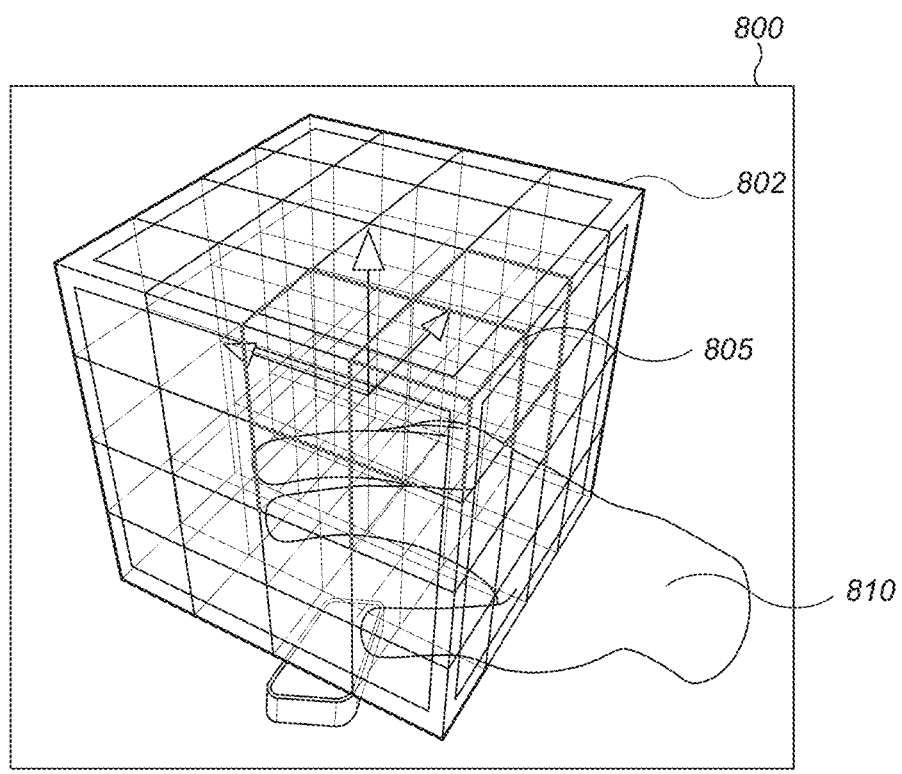
FIGS. 8 and 9 show a recipient object intersecting with a haptic object.

The second stage is achieved by utilizing intersection tests between the haptic objects and the recipient objects. Shown in FIG. 8 is a second-state schematic 800 where a recipient object 810 intersects with a haptic object 802. The gray outlined regions 805 are those that are intersecting with the object 810.

This happens in two parts, the first being a single overall intersection test with the object as a whole, where haptic objects would test themselves to see if any recipient object was intersecting with themselves. This test was event based which meant it would fire an event when any object was intersected, and then fire another event when an object left the haptic object boundaries. A secondary test on this would check to ensure that a recipient object was intersecting, rather than simply firing for every possible object intersection. If a recipient object was intersecting a haptic object, then a second round of tests would start occurring, where the individual regions would then be tested for intersections. These intersected regions would be sent to a collective manager in which these individually intersecting regions would be collated. These intersection tests happen in real-time, while the simulation is running. Both objects can be moving and changing, as the regions for the haptic objects are relative to the object, with physics tests simply happening every physics frame as necessary.

The final step of the process used the collated set of regions from the second step to produce an array of 3D positions for which the haptic focal point could traverse between. A number of positioning methods can be used to create these points. The first method simply takes the origin position of each region and plays predefined haptic sensations at said points. A secondary approach extends the first by adding noise over time to the origin position. Our third method uniformly fills each region with a developer defined count of points, either derived from a defined division count per region, or by size. The final method would fill each individual region with a developer defined number of randomized positions. These positions are defined by randomizing values between the three size axis of the individual regions. These points would be sequentially iterated over during interaction with the haptic object at high speed (sub 50 ms rate). Smoothing algorithms can be applied to the positions during this stage. Two different states decided when these points would be created or re-created. The first being if the overall array of randomized points had been fully iterated over, or the second of if the currently intersecting set of regions had been modified or changed. By producing these randomized points, they will, by design, extend slightly beyond the overall intended or entirely accurate positioning of the recipient object. This positional "buffer" allows for lapses within the tracking solutions complete accuracy, while still producing usable results.

This solution only requires utilizing one hand-tracking device, without restricting the tracking of the hands to the mid-air haptic arrays position. This reduces overall processing power required from using two hand-tracking devices and enables the creation of physically larger virtual environments while still being able to produce effective haptics.

Unlike an octree (https://en.wikipedia.org/wiki.Octree) (accessed Aug. 12, 2021), the regions of an object can be varying in dimensions, rather than having to be perfect cube based regions.

Due to the nature of how the virtual objects intersect, unintended jitter due to VR or AR tracking solutions can be mitigated as the haptics will still be produced in regions larger than a fixed bone position.

B. Part II

Optical hand tracking specific haptics were implemented through the usage of the Ultraleap STRATOS Explore haptic array. Our implementation was designed to provide as high percentage of haptic feedback being applied to the participants hand as possible, without having to rely on particularly cumbersome or restrictive setups. This meant only relying on a single hand tracking device to report positions, but also not affixing the hand tracker to the haptic array itself. Both of those setups require extra costs, be it increased performance load on the system and extra hardware costs (when using two devices), or physical restraints to what and where the simulation could be interacted with. To this extent, we chose to develop a method of implementation that does not rely on the direct position of the hand for placing haptics, but that of the currently interacting objects.

The haptic implementation we developed relies on the interaction between the virtual hand and the virtual objects. As the objects in the environment are touched by the participants hands, and therefore intersected, they become "active" within the implementation and are then processed to produce haptic effects. Sensations are applied on an object level, instead of relying on bone positions reported by the hand.

The focal point that the haptic array creates is around 8 mm in diameter (Ito et al. 2016), which is significantly smaller than any of the objects we were using within our study. Producing the haptic effect using the entire area of the object would be inefficient as we could not be assured as to where the hand was touching. To alleviate this, each interactable object was subdivided into regions, based upon the overall size of the mesh. Similar previous implementations rely on theories such as voxels, being uniform in size across all three axes of each division. Unlike voxels which are completely uniform in size, our method used regions that were sized based upon a developer defined 3 axis vector. This vector defined how many subdivisions would occur across each of the object's axes. These regions were defined before runtime, however, could be adjusted or recalculated in real time if necessary. All regions would follow the overall position, scale, and rotation of the object, allowing for easy recalculation based upon object movement. See FIG. 7.

To ensure that the hand would be receiving haptics, even when not receiving optimal positioning from the tracking, we expanded the overall radius of the finger bones by 25%. This would mean the fingers would still report intersections with objects, even if there was a slight difference between the real-world position of the hands due to tracking jitter or inaccuracies.

Intersection tests would be run on the interactable object as a two-stage process. If the object is in its idle/non-contact stage, then only the top-level intersection test to check whether a hand had touched it. Once a hand had started intersecting with the object then the second level, region intersection test would be fired. All regions that were intersecting the hands would be collated, including those that are from other objects, into one final region. See FIG. 8.

Figure 9:
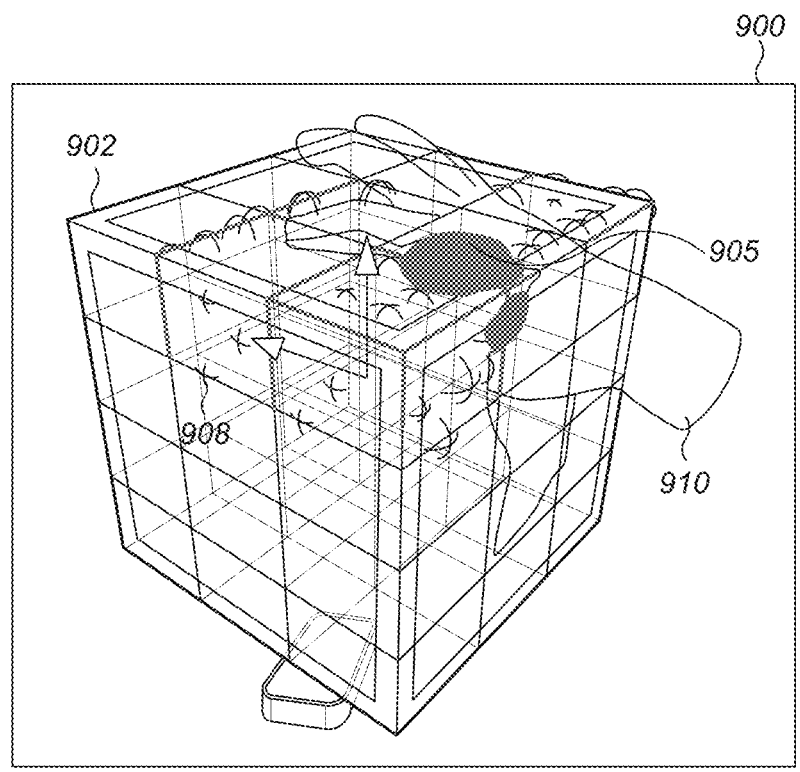

This collated region would be used as the volume in which possible haptic positions would be calculated. These haptic positions were generated as a random array of points inside of the region. Every few milliseconds, the current index of the array would be changed, with the haptic sensation moving its position to the next position. Both the total number of possible positions, and the speed of iteration was developer defined, in our case we chose to use 40 points per individual region and an iteration speed of 40 milliseconds. These values gave us a good balance between consistently filling the volume with haptic feedback, thus increasing hit rate with the hand, while also retaining a high level of object presence. Shown in FIG. 9 is a schematic 900 where a recipient object 910 intersects with a haptic object 902. The black cross-hatches 908 represent possible haptic points, while the gray region 905 represents the current position of the focal point.

Combined with the positions, a secondary motion could be applied on top of this, for our situation we chose to use a circular motion as this helped to reduce the overall sound of the sensation. This circular motion was modulated at a frequency of 60 Hz. Each instance of the circle had a radius equal to that of the average size of all currently interacting haptic regions. In practice this would mean that a region with a size of 0.2 cm, from a square magnitude of its 3 axis, and another of 0.3 cm would result in a circle radius of 0.25 cm.

There were two conditions that caused positions to be regenerated. Either that the collection of intersecting regions had changed, or that the overall collection of positions had been fully iterated over. Once either of these conditions had been met, then the generation of points would re-occur. Counter to this, the intersection tests would occur every physics step within the simulation, as long as they were being intersected with the object as a whole.

This solution improved the successful hit rate of providing the haptics onto the hand, as the focal point can often be slightly misaligned when targeting the pure hand tracking position. Variable positioning from the headset, and therefore hand tracking origin, and jitter introduced by the SteamVR tracking solution, did not reduce the overall effect of the implementation as the object regions were sufficiently larger than the hand.

The solution for mid-air haptics was designed to help produce beneficial results when working with a relatively common scenario, where the hand tracking device is attached to the VR headset. This implementation meant that participants would still be able to visually see their hands at all times. The current standard implementation of mid-air haptics relies almost entirely on a fixed origin tracker, which is generally attached to the mid-air haptic array. While the standard implementation provides a more accurate set of hands for applying haptics due to lack of secondary tracking jitter, it severely limits the area in which the user can interact with the system.

Hand tracking provided from a headset mounted orientation was proven to produce more stable results, compared to from a desk mounted orientation, even if less accurate overall for the application of haptics. During prior studies and work, we had witnessed that desktop mounted hand tracking through Leap Motion hand trackers provides poorer results due to using an older tracking software stack, older hardware with reduced field of view, and multiple issues with hand occlusion. At times these issues can cause in descript objects in the trackers field of view to be reported as hands, thus causing the participant to become distracted due to unnatural or unexpected movements. Ensuring a high level of visual consistency throughout the study was paramount.

IV. Conclusion

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

Further, in this specification the overbar operator, as used in expressions such as for example $\overline{\alpha(X)}$, is defined as having a real scaling factor on each vector component for prioritizing transducers and thus generating weighted basis vectors in the space of complex-valued transducer activations in addition to the usual meaning of complex conjugation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:
    an acoustic field controlled via a plurality of control points in mid-air, wherein each of the plurality of control points is assigned a value equating to a desired amplitude at the control point;
    a plurality of transducer elements having a transducer output for creating the acoustic field exhibiting the desired amplitudes at the plurality of control points;
    a new control point having a new degree of freedom incrementally added to the acoustic field smoothing its effect on the transducer output via introduction of a blending coefficient so that the new degree of freedom is incrementally added to the acoustic field;
    wherein the new control point is incrementally added to the acoustic field by creating an interpolation between a matrix that allows interaction between the plurality of control points and a matrix that prevents interactions between the plurality of control points;
    wherein the interpolation is described as $$(PCP^H + (I-PP^H)C\,\text{diag})z' = b,$$

wherein I is an identity matrix;
    wherein $PP^H$ is an m×m matrix where diagonal elements are squares of corresponding control point blending coefficients;
    wherein $PCP^H$ is a modified C matrix with the blending coefficient corresponding to the control point of the row and the blending coefficient corresponding to the control point of the column both multiplying each of the C matrix elements;

wherein $(I-PP^H)C_{diag}$ is a matrix that cancels the modified diagonal of $PCP^H$ having a diagonal modified by the blending coefficient of both the row and column which is the same such that a corresponding diagonal element is a square;

wherein the portion of $(I-PP^H)C_{diag}$, $IC_{diag}$ then replaces the modified diagonal of $PCP^H$ with the original diagonal of the C matrix $C_{diag}$ leaving it unmodified by application of the blending coefficients;

wherein z' is a solution vector whose $j^{th}$ component describes a proportion of each of a set of complex-valued basis vectors whose components respectively describe a scalable portion of a drive of each transducer that is applicable to the $j^{th}$ control point; and wherein b is the vector of the desired complex-valued acoustic quantities at each of the defined control points.

2. The system as in claim 1, further comprising: a number of the plurality of control points fewer than a number of the plurality of transducers elements placed into a complex-valued linear system with the sample vector $b=\{\alpha_1(y1), \ldots, \alpha_m(X_m)\}$ representing a desired total linear scalar complex-valued acoustic quantity; wherein amplitudes are desired amplitudes of an acoustic quantity and phases are taken from a phase oracle; and wherein $\alpha_m(X_m)$ represents a complex-valued component associated with the $m^{th}$ defined control point.

3. The system as in claim 2, wherein at least one component of the sample vector b comprises an interpolation between a complex-valued simulated measurement of the acoustic field at a required location and the desired complex-valued acoustic quantity at the required location.

4. The system as in claim 3, wherein if the desired complex-valued linear system is described as Ax=b, an x vector comprises field coefficients for each of the plurality of transducer elements;

wherein A represents the modelled transducer output given an input with unit amplitude and zero phase.

5. The system as in claim 3, wherein the desired complex-valued linear system is used to drive the plurality of transducers elements in a loop.

* * * * *